(12) United States Patent
Shibayama et al.

(10) Patent No.: US 11,080,080 B2
(45) Date of Patent: *Aug. 3, 2021

(54) VIRTUAL MACHINE AND VOLUME ALLOCATION IN HYPERCONVERGED INFRASTRUCTURE ENVIRONMENT AND STORAGE SYSTEM

(71) Applicant: HITACHI, LTD., Tokyo (JP)

(72) Inventors: Tsukasa Shibayama, Tokyo (JP); Akiyoshi Tsuchiya, Tokyo (JP); Tomohiro Kawaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,584

(22) Filed: Mar. 11, 2019

(65) Prior Publication Data

US 2020/0104151 A1 Apr. 2, 2020

(30) Foreign Application Priority Data

Sep. 27, 2018 (JP) .............................. JP2018-181418

(51) Int. Cl.
*G06F 9/455* (2018.01)
*G06F 3/06* (2006.01)
*G06F 9/50* (2006.01)

(52) U.S. Cl.
CPC ........ *G06F 9/45558* (2013.01); *G06F 3/0604* (2013.01); *G06F 3/067* (2013.01); *G06F 3/0658* (2013.01); *G06F 9/5016* (2013.01); *G06F 9/5027* (2013.01); *G06F 2009/45579* (2013.01); *G06F 2009/45595* (2013.01)

(58) Field of Classification Search
CPC .. G06F 9/45558; G06F 9/5027; G06F 9/5016; G06F 3/0604; G06F 3/067; G06F 9/4856
See application file for complete search history.

(56) References Cited

U.S. PATENT DOCUMENTS

| | | | |
|---|---|---|---|
| 8,447,850 B2* | 5/2013 | Moriyasu | G06F 9/5077 709/223 |
| 2009/0172666 A1 | 7/2009 | Yahalom et al. | |
| 2010/0211829 A1* | 8/2010 | Ziskind | G06F 11/0709 714/48 |

(Continued)

FOREIGN PATENT DOCUMENTS

| | | |
|---|---|---|
| JP | 2010-212807 A | 9/2010 |
| JP | 2014-021847 A | 2/2014 |
| WO | 2018/029820 A1 | 2/2018 |

*Primary Examiner* — Benjamin C Wu
(74) *Attorney, Agent, or Firm* — Volpe Koenig

(57) ABSTRACT

Provided is a resource allocation determination method for a VM/container, volume, and the like created as a new VM/container or volume without exceeding an upper limit of a computer resource of a node in an HCI environment. In order to determine allocation of at least one of a virtual machine, a container, and a volume in a system of the HCI environment, a use state of a computer resource shared by a virtual machine and a storage controller operating on each node is managed, and an allocation destination node of the new virtual machine, container, or volume is determined based on the use state without exceeding an upper limit of a computer resource of the allocation destination node.

12 Claims, 27 Drawing Sheets

(56) References Cited

U.S. PATENT DOCUMENTS

| | | | |
|---|---|---|---|
| 2013/0159997 A1* | 6/2013 | Cawlfield | G06F 9/45558 718/1 |
| 2014/0082165 A1* | 3/2014 | Marr | G06F 9/5044 709/222 |
| 2014/0101279 A1* | 4/2014 | Nagami | H04L 67/1097 709/213 |
| 2014/0207944 A1* | 7/2014 | Emaru | H04L 47/78 709/224 |
| 2016/0004551 A1* | 1/2016 | Terayama | G06F 9/45558 718/1 |
| 2016/0203080 A1* | 7/2016 | Bert | G06F 11/16 711/114 |
| 2018/0285016 A1* | 10/2018 | Akutsu | G06F 3/0664 |
| 2019/0227845 A1* | 7/2019 | Sridhar | G06F 3/0653 |
| 2020/0076681 A1* | 3/2020 | Takashige | G06F 3/0631 |

* cited by examiner

FIG. 6

507 STORAGE NODE PHYSICAL CONFIGURATION TABLE

601 NODE PHYSICAL RESOURCE TABLE

| NODE ID | CPU_IDs | MEMORY | DISK_IDs | PORT_IDs |
|---|---|---|---|---|
| 1 | 1 | 1 | 1 | 1 |
| 2 | 1 | | | |
| 3 | 2 | | | |
| ... | | | | |

602 CPU PHYSICAL RESOURCE TABLE

| CPU_ID | NUMBER OF CORES | FREQUENCY | ... | NODE ID |
|---|---|---|---|---|
| 1 | 1 | 1 | | 1 |
| 2 | 2 | | | |
| 3 | | | | |
| ... | | | | |

603 DRIVE PHYSICAL RESOURCE TABLE

| DISK_ID1 | CAPACITY | TYPE | ... | NODE ID |
|---|---|---|---|---|
| 1 | 1G | HDD | | |
| 2 | | SSD | | |
| 3 | | | | |
| ... | | | | |

604 PORT PHYSICAL RESOURCE TABLE

| PORT_ID | TYPE | SPEED | ... | NODE ID |
|---|---|---|---|---|
| 1 | FC | 100 | | 1 |
| 2 | ISCSI | | | |
| 3 | | | | |
| ... | | | | |

FIG. 7
509    VM MANAGEMENT TABLE

| VM_ID | NODE ID | DATA STORE ID | ROLE | CPU | MEMORY | DISK | PORT | VOLUME |
|---|---|---|---|---|---|---|---|---|
| 1 | 1 | | STORAGE CONTROL/MANAGEMENT | 1 | 100 | 1 | 1 | 1 |
| 2 | 1 | | VM MANAGEMENT/TRANSFERRING | | | | | |
| 3 | 1 | | CONTAINER MANAGEMENT | | | | | |
| 4 | 1 | | USER APPLICATION OS | | | | | |
| 5 | 1 | | USER APPLICATION OS | | | | | |
| 6 | 2 | | STORAGE CONTROL/MANAGEMENT | | | | | |
| 7 | 2 | | VM MANAGEMENT/TRANSFERRING | | | | | |
| 8 | 2 | | CONTAINER MANAGEMENT | | | | | |
| 9 | 2 | | USER APPLICATION OS | | | | | |
| 10 | 2 | | USER APPLICATION OS | | | | | |
| 11 | 3 | | | | | | | |

FIG. 8
510  CONTAINER MANAGEMENT TABLE

| CONTAINER ID | VM_ID | IP ADDRESS | CPU | MEMORY |
|---|---|---|---|---|
| 1 | 1 |  | 3 | 50 |
| 2 | 1 |  |  |  |
| 3 | 1 |  |  |  |
| 4 | 2 |  |  |  |
| 5 | 2 |  |  |  |
| 6 | 2 |  |  |  |
| 7 | 3 |  |  |  |
| 8 | 4 |  |  |  |
| 9 |  |  |  |  |
| 10 |  |  |  |  |

515  APPLICATION MANAGEMENT TABLE

| APP_ID | VM_ID/CONTAINER ID | NODE ID | UTILIZATION |
|---|---|---|---|
| 1 | 1 | 1 | STORAGE CONTROLLER |
| 2 | 2 | 1 | USER APPLICATION |
| 3 | 2 | 1 | USER APPLICATION |
| 4 | 3 | 1 | USER APPLICATION |
| 5 | 3 | 1 | USER APPLICATION |
| 6 | 1 | 1 | STORAGE CONTROLLER |
| 7 | 2 | 1 | USER APPLICATION |
| 8 | 3 | 1 | USER APPLICATION |

FIG. 10

508 STORAGE NODE LOGICAL CONFIGURATION TABLE

1001 POOL CONFIGURATION INFORMATION

| POOL ID | CAPACITY | NAME | NODE ID | REDUNDANCY TYPE | REDUNDANCY DESTINATION NODE ID |
|---|---|---|---|---|---|
| 1 | 1000 | POOL1 | 1 | MIRROR | 2 |
| 2 |  |  | 1,2 | EC(3D+1P) | 3,4,5,6 |
| ... |  |  | 1 |  |  |

1002 VOLUME CONFIGURATION INFORMATION

| VOLUME ID | NAME | CAPACITY | BLOCK NUMBER | POOL ID | NODE ID | DATA STORE ID | ASSIGNED VM_ID | ASSIGNED CONTAINER ID | ... |
|---|---|---|---|---|---|---|---|---|---|
| 1 | VOLUME 1 | 100 | 512 | 1 | 1 | 1 | 1,2 | - |  |
| 2 |  |  |  | 1 | 1,2 | 2 | 3 | - |  |
| 3 |  |  |  | 2 | 1 | 3 | 4 | 1,2,3 |  |
| 4 |  |  |  | 2 | 1 | - | - | - |  |
| ... |  |  |  |  |  |  |  |  |  |

FIG. 11

512 CAPACITY OPERATION INFORMATION

1101 POOL CAPACITY OPERATION INFORMATION

| POOL ID (11011) | CAPACITY (11012) | TIME (11013) | USE AMOUNT (11014) |
|---|---|---|---|
| 1 | 1000 | 10:00 | 100 |
| | | 11:00 | 110 |
| | | 12:00 | 150 |
| | | ... | |
| 2 | | 10:00 | |
| ... | | | |

1102 VOLUME CAPACITY OPERATION INFORMATION

| VOLUME ID (11021) | CAPACITY (11022) | TIME (11023) | USE AMOUNT (11024) |
|---|---|---|---|
| 1 | 100 | 10:00 | 20 |
| | | 11:00 | 30 |
| | | 12:00 | 50 |
| 2 | | 10:00 | |
| ... | | | |

1103 VM CAPACITY OPERATION INFORMATION

| VM_ID (11031) | CAPACITY (11032) | TIME (11033) | USE AMOUNT (11034) |
|---|---|---|---|
| 1 | 100 | 10:00 | 20 |
| | | 11:00 | 30 |
| | | 12:00 | 50 |
| 2 | | 10:00 | |
| ... | | | |

1104 APPLICATION CAPACITY OPERATION INFORMATION

| APP_ID (11041) | CAPACITY (11042) | TIME (11043) | USE AMOUNT (11044) |
|---|---|---|---|
| 1 | 100 | 10:00 | 20 |
| | | 11:00 | 30 |
| | | 12:00 | 50 |
| 2 | | 10:00 | |
| ... | | | |

FIG. 12

511  VM IO AMOUNT MANAGEMENT TABLE

| VM_ID | IO TYPE | TIME | AMOUNT |
|---|---|---|---|
| 1 | READ IO NUMBER | 10:00:00 | 100 |
| | | 10:00:05 | 110 |
| | | 10:00:10 | 80 |
| | | ... | |
| | WRITE IO NUMBER | 10:00:00 | 50 |
| | | 10:00:05 | 50 |
| | | 10:00:10 | 0 |
| | | ... | |
| 2 | | | |
| ... | | | |

FIG. 13

506 PERFORMANCE OPERATION INFORMATION

1301 NODE PERFORMANCE OPERATION INFORMATION

| NODE ID | METRIC | TIME | AMOUNT |
|---|---|---|---|
| 1 | CPU USE RATE | 10:00:00 | 30% |
|   |              | 10:00:05 | 20% |
|   |              | ...      |     |
|   | MEMORY USE AMOUNT | 10:00:00 | 10GB |
|   |                   | 10:00:05 | 10GB |
|   |                   | ...      |      |
|   | USED BANDWIDTH | 10:00:00 | 5Gbps |
|   |                | 10:00:05 | 5Gbps |
|   |                | ...      |       |
| 2 |   |   |   |
| ... |   |   |   |

1302 VM PERFORMANCE OPERATION INFORMATION

| VM_ID | METRIC | TIME | AMOUNT |
|---|---|---|---|
| 1 | CPU USE RATE | 10:00:00 | 3% |
|   |              | 10:00:05 | 2% |
|   |              | ...      |    |
|   | MEMORY USE AMOUNT | 10:00:00 | 1GB |
|   |                   | 10:00:05 | 1GB |
|   |                   | ...      |     |
|   | USED BANDWIDTH | 10:00:00 | 1Gbps |
|   |                | 10:00:05 | 1Gbps |
|   |                | ...      |       |
| 2 |   |   |   |
| ... |   |   |   |

FIG. 14

513 NODE UNIT OPERATION INFORMATION

| NODE ID | CPU UPPER LIMIT | CPU USE RATE | MEMORY UPPER LIMIT | MEMORY USE AMOUNT | NW BAND UPPER LIMIT | NW BAND USE AMOUNT | CAPACITY UPPER LIMIT | CAPACITY USE AMOUNT | VM_ID | CPU USE AMOUNT | MEMORY USE AMOUNT | NW BAND USE AMOUNT | CAPACITY USE AMOUNT | IO AMOUNT | |
|---|---|---|---|---|---|---|---|---|---|---|---|---|---|---|---|
| 1 | 100% | 30% | 64GB | 30GB | 32 Gbps | 10Gbps | 10TB | 40TB | 1 | 7 | 5 | 2 | 5 | RD | 100 |
| | | | | | | | | | | | | | | WR | 10 |
| | | | | | | | | | 2 | 3 | 6 | 2 | 5 | RD | 100 |
| | | | | | | | | | | | | | | WR | 20 |
| | | | | | | | | | 3 | 4 | 1 | 1 | 5 | RD | 80 |
| | | | | | | | | | | | | | | WR | 30 |
| | | | | | | | | | 4 | 7 | 10 | 4 | 15 | RD | 50 |
| | | | | | | | | | | | | | | WR | 50 |
| | | | | | | | | | 5 | 9 | 8 | 1 | 10 | RD | 60 |
| | | | | | | | | | | | | | | WR | 30 |
| 2 | | | | | | | | | 6 | | | | | | |
| | | | | | | | | | 7 | | | | | | |
| | | | | | | | | | 8 | | | | | | |
| | | | | | | | | | | | | | | | |

Column references: 1401, 1402, 1403, 1404, 1405, 1406, 1407, 1408, 1409, 1410, 1411, 1412, 1413, 1414, 1415

FIG. 20

2000 STORAGE CONTROLLER CONFIGURATION INFORMATION

| APP_ID (STORAGE CONTROLLER_ID) | STATE | GROUP ID | OPERATION NODE ID | VM_ID |
|---|---|---|---|---|
| 1 | ACTIVE | 1 | 1 | 1 |
| 6 | STANDBY | 1 | 2 | 2 |
| 10 | ACTIVE | 2 | 2 | 1 |
| 15 | STANDBY | 2 | 3 | 2 |
| 20 | ACTIVE | 3 | 3 | 1 |
| 26 | STANDBY | 3 | 1 | 2 |
| ... | | | | |

VIRTUAL MACHINE AND VOLUME ALLOCATION IN HYPERCONVERGED INFRASTRUCTURE ENVIRONMENT AND STORAGE SYSTEM

BACKGROUND OF THE INVENTION

1. Field of the Invention

The present invention relates to VM/container and data allocation determination in a hyperconverged infrastructure (HCI) environment.

2. Description of the Related Art

In recent years, a virtualization technique is widely used, in which hardware (for example, a CPU and peripheral equipment) is virtualized by adding layers of software (for example, an OS) and details of a method of interfacing with hardware from a user is "hided".

This virtualization technique allows a plurality of virtualized computers (for example, VMs, containers) to share physical resources, and other virtual computers are allowed to use the shared resources during an inactive period of one virtualized computer, thereby using physical devices efficiently and improving resource management costs. However, in a storage network environment in which many VMs are mounted, congestion and bottleneck may occur since VMs or virtual servers share the same file system in a SAN. US Patent Application Publication NO. 2009/0172666 (Patent Literature 1) discloses a storage IO load distribution method which employs a technique of distributing a load by migrating VMs to different physical servers in a system configured by a plurality of servers.

SUMMARY OF THE INVENTION

Patent Literature 1 does not mention an effective use of a computer resource in a so-called hyperconverged (HCI) environment in which the computer resource is shared by a VM and a storage OS. That is, Patent Literature 1 does not mention to which node a VM, volume, and the like should be allocated in consideration of both a computer resource for processing data of an application running on a VM and a computer resource for processing reading/writing of data from an application of a storage OS (storage controller).

In addition, Patent Literature 1 does not mention allocation of a VM and a volume when data is redundant between a plurality of nodes in consideration of a computer resource used by a storage controller for writing redundant data from a storage controller of another node.

An object of the invention is to provide an allocation determination method and a storage system for a VM/container, volume, and the like created as a new VM/container or volume without exceeding an upper limit of a computer resource of a node in an HCI environment.

The invention provides an example of a resource allocation determination method for solving the above problem. The resource allocation determination method determines allocation of at least one of a virtual machine, a container, and a volume in a system of a hyperconverged infrastructure environment. The system includes a plurality of nodes, and in each of the plurality of nodes, at least one of the virtual machine and the container operates, and at least one of the virtual machine or the container serves as a storage controller which operates a storage OS, and controls data reading from and data writing to a volume which serves as a data storage area. Each node of the plurality of nodes includes a computer resource including a CPU that processes data, a memory, and a storage device that stores a program, control information and data, and manages a use state of the computer resource, the computer resource being shared by the virtual machine and the storage controller operating on each of the nodes. A management unit determines, based on the use state, an allocation destination node of a new virtual machine, container, or volume without exceeding an upper limit of a computer resource of the allocation destination node.

According to the invention, a new VM/container or volume can be created without exceeding an upper limit of a computer resource of a node based on a condition of the VM/container or volume.

Even when no node satisfies the condition of the newly created VM/container or volume, an existing VM/container or volume is migrated so as to satisfy the condition when there is a node whose computer resource can be ensured to satisfy the condition as a result of migrating the existing VM/container or volume, so that the new VM/container or volume can be created without exceeding an upper limit of the computer resource of the node.

When a node failure occurs, a VM, a container, or a volume allocated on a node in which the failure occurs can be made redundant again, while an allocation destination of a newly created VM/container or volume can be calculated without exceeding an upper limit of a computer resource of the node.

In a storage system having a multi-node configuration, an IO amount generated at anode is calculated in consideration of an IO from another node based on data redundancy, and an allocation destination of a VM/container or volume can be thus calculated.

BRIEF DESCRIPTION OF THE DRAWINGS

FIG. 6 shows a storage node physical configuration table stored in a memory of a node;

FIG. 7 shows a VM management table stored in a memory of a node;

FIG. 8 shows a container management table stored in a memory of a node;

FIG. 9 shows an application management table stored in a memory of a node;

FIG. 10 shows a storage node configuration table stored in a memory of a node;

FIG. 11 shows capacity operation information stored in a memory of a node;

FIG. 12 shows an IO amount management table stored in a memory of a node;

FIG. 13 shows performance operation information stored in a memory of a node;

FIG. 14 shows node unit operation information stored in a memory of a node;

FIG. 20 shows configuration information of a storage controller according to Example 3;

DESCRIPTION OF EMBODIMENTS

Definitions of Terms in Specification

Figure 1:
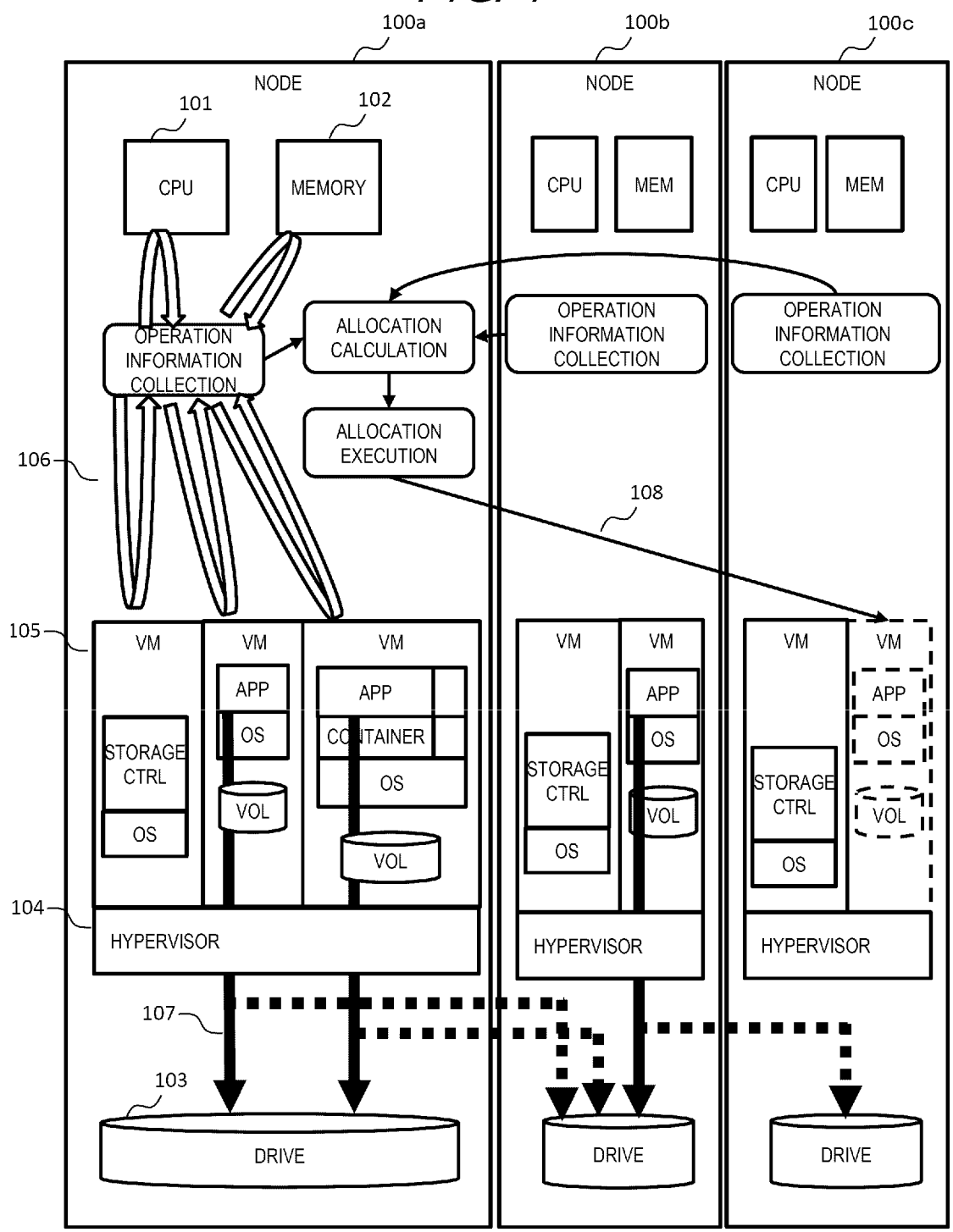
FIG. 1 is a schematic explanatory diagram of an overall configuration of a system.

Hereinafter, an embodiment of the invention will be described with reference to the drawings. In the drawings, the same components are denoted by the same reference numerals.

The embodiment of the invention will be described in detail with reference to the drawings. The following description and drawings are examples for explaining the invention, and are omitted and simplified as appropriate for clarification of the description. The invention can be implemented in various other modes. Constituent elements may be singular or plural, unless otherwise specified.

For easy understanding of the invention, a position, size, shape, range, or the like of each component illustrated in the drawings may not represent an actual position, size, shape, range, or the like. Therefore, the invention is not necessarily limited to the position, size, shape, range, or the like disclosed in the drawings.

In the following description, various types of information may be described in terms of expressions such as "table", "list", and "queue", but the various types of information may be represented by other data structures. "XX table", "XX list", and the like may also be referred to as "XX information", so as to indicate that the information does not depend on the data structure. When identification information is described, expressions such as "identification information", "identifier", "name", "ID", "number", and "Region" are used, but these expressions may be replaced with each other.

When a plurality of constituent elements having the same or similar functions are provided, the same reference numerals may be given with different subscripts. However, the subscripts may be omitted when there is no need to distinguish the plurality of constituent elements.

In the following description, processing performed by executing a program may be described. However, a subject of the processing may be a processor since the program appropriately performs a predetermined processing using a storage resource (for example, a storage device) and/or an interface device (for example, a communication port) or the like by a processor (for example, a CPU or a GPU). Similarly, the subject of the processing performed by executing the program may be a controller, a device, a system, a computer, or a node including a processor therein. The subject of the processing performed by executing the program may be a control unit, and may include a dedicated circuit (for example, an FPGA or an ASIC) that performs a specific processing.

The program may be installed from a program source into a device such as a computer. The program source may be, for example, a program distribution server or a computer-readable storage medium. When the program source is a program distribution server, the program distribution server includes a processor and a storage resource that stores the program to be distributed, and the processor of the program distribution server may distribute the program to be distributed to another computer. In addition, in the following description, two or more programs may be realized as one program, or one program may be realized as two or more programs.

<Overview of Virtualization>

"Virtualization" to which the present invention is applied will be described below.

The term "virtualization" has many meanings in an area of computers and operating systems (OSs), and an area of storage and networks. By adding a layer of software (for example, an OS), hardware (for example, a CPU and peripheral equipment) can be virtualized to "hide" details of an interface method of hardware from a user. Similarly, by adding a layer of software (for example, a hypervisor), an OS can be virtualized to "hide" details of an interface method of the OS. A user can write codes to perform certain functions without strongly relying on an infrastructure as a basis, such as a specific OS or a specific configuration of a specific vendor or hardware.

A "virtual machine" or "VM" refers to implementation of certain software-based machines in a virtualized environment through virtualizing hardware resources of an actual computer (for example, a CPU, a memory) or converting the hardware resources into the virtualized environment. In the present specification, a "virtual machine" may be simply referred to as a "VM". A fully functional virtual machine, which can execute an independent OS and applications on a basic physical resource in the same manner as an actual computer, is supported. Virtualization functions by directly inserting a thin layer of software into computer hardware or a host OS. The software layer includes a virtual machine monitor or a "hypervisor" that dynamically and transparently assigns hardware resources. A plurality of OSs are executed simultaneously on a single physical computer and share hardware resources with each other.

In recent years, container-based virtualization technology becomes widespread. Compared to a virtual machine created to execute on a host OS which imitates an independent physical machine, a container virtualizes applications that can be executed directly in a user space on a kernel of an OS. Applications such as a Web server and a database executed from within a container do not require an emulation layer or a hypervisor layer in an interface of a physical machine.

Instead, "containerized" applications can function using a normal system call of an OS. In this way, since the container does not require a virtualized guest OS, the container generally provides a quicker (for example, quicker transferring, and quicker boot or load) OS-level virtualization than a virtual machine.

One reason why virtualization technologies such as virtual machines and containers are widely adopted is because resources provided by a virtual architecture have advantages. Without virtualization, a physical machine is not used to perform beneficial operations during an inactive period of the dedicated OS when the physical machine is limited to a single dedicated OS. This is wasteful and inefficient if a user on another physical machine is waiting for computing resources at that time. In contrast, virtualization allows a plurality of virtualized computers (for example, VMs, containers) to share physical resources, and other virtual computers are allowed to use the shared resources during an inactive period of one virtualized computer, so that physical devices may be used efficiently and resource management costs may be improved.

Example 1

In Example 1, processing in a basic configuration will be described. The basic configuration refers to a hyperconverged configuration obtained by using a hypervisor to logically divide a computer resource such as a CPU or a memory of each node.

System Overview

FIG. 1 is a schematic explanatory diagram of an overall configuration of a system. In each node 100, a hypervisor 104 is operated, such that virtual computers (virtual machines VM) are created in a physical node, and a plurality of different OSs are executed in parallel within the same physical node 100.

First, the configuration of the system operated in Example 1 will be described. The system includes a plurality of nodes 100, and each node 100 includes computer resources such as a CPU 101, a memory 102, and a drive 103 serving as a storage device. An environment in which Example 1 is implemented is a so-called hyperconverged infrastructure (HCI) environment, known as a virtual infrastructure that integrates computing and storage functions on a general server and is a simple configuration. In the HCI environment, an application VM that operates an application, and storage VMs that operates a container and a storage controller are provided in the same node, and share a computer resource (such as a CPU or a memory). In the present specification, an application VM that issues an IO command as a general server, a storage VM that operates as a storage controller, and a container are referred to as virtualization software.

Accordingly, in each node 100, at least one of a virtual machine or a container is operated; at least one virtual machine serves or the container as a storage controller which operates a storage OS; and data reading and data writing from and to a volume, which serves as a data storage area, are controlled.

The application VM and the container may simply be referred to as a VM/container, or may be simply referred to as a VM in comparison with a storage VM (storage controller) that operates as a storage controller.

An OS on each VM 105 accesses a storage device drive via a volume provided by the storage controller. In a multi-node configuration including a plurality of nodes 100, in order to make data redundant, data to be written to a volume configured by a drive through a function of the storage controller are written to a drive of another node to perform redundancy processing. The redundancy processing is performed using, for example, mirroring or Erasure Coding technology. In FIG. 1, a write operation described by a solid line shows a write operation to the volume configured by the drive by the function of the storage controller, while a write operation described by a dotted line shows the redundancy processing in which the writing to the drive of the other node is performed.

In order to perform input/output (IO) to the volume, the storage controller uses a CPU of the node to write data to the drive or read data from the drive, physically. As shown by the dotted line, the CPU is used as the storage controller in an IO processing when the data transferred from the other node for the redundancy are written.

Therefore, in each node, a change amount of CPU use required by the storage controller is generally larger than an IO amount of an application VM.

In the HCI environment, it is necessary to allocate each VM or volume in consideration of the computer resources shared by the application VM and the storage controller VM. In the invention, a technique is proposed in which, for example, the application VM and the storage VM or volume are allocated so that a computer resource required by the application VM and the storage VM is within the computer resource of each node. Example 1 will describe a mode assuming that a container is included as the application VM.

A CPU use amount required on the storage controller side is calculated by a CPU resource required as the storage controller based on an IO amount of data R/W by the application VM. At this time, it is also necessary to consider a redundancy degree (a ratio between user data of mirroring and Erasure Coding, and parity data for data protection), but in Example 1, calculation of the IO amount of the redundancy is not described. The calculation of the IO amount of the redundancy will be described in Example 3 and subsequent examples.

When the volume and the application VM are allocated (deployed), the VM and the volume are allocated in such a manner that a sum of CPU use amounts of CPUs used by all VMs is within an upper limit of the CPU use amount of the node. If the allocation cannot be performed, existing application VMs or volumes are migrated to other nodes, and use of the computer resources of the nodes are balanced in the system so that the volume and the application VM can be allocated.

The above is an example of the CPU use amount. Similarly, for all resources shared by the application VM and the storage controller VM (memory, drive capacity, NW bandwidth, etc.), in order to prevent a use amount of each resource from exceeding an upper limit value of each node, the use of the computer resources of the nodes is balanced in the system so that the volume and the application VM can be allocated according to each resource.

FIG. 1 shows a situation in which in each node 100, an application VM executes a data writing or reading (IO) processing 107 with respect to the drive in the node.

In a node 100a, two application VMs execute the IO processing, and the drive executes the IO processing from the two applications VM. In a node 100b, one application VM executes the IO processing, and the IO processing is executed in the drive. In a node 100c, the IO processing with respect to the drive is not executed.

A sum of the IO processing on the application VM side and on the drive side is "2" in the node 100*a*, "1" in the node 100*b*, "0" in the node 100*c*, and a load is imbalanced between the nodes.

FIG. 1 shows a method of Example 1. The method includes: collecting (106) operation information of computer resources such as a drive CPU 101, a memory 102, each VM 105, and a drive 103 by each node 100; and performing allocation (108) of actually creating a new VM or volume in the node 100*c* by performing an allocation calculation based on the operation information by the node 100*a* to allocate the volume and the application VM in the node 100*c* so as to balance the load between the nodes.

Figure 2:
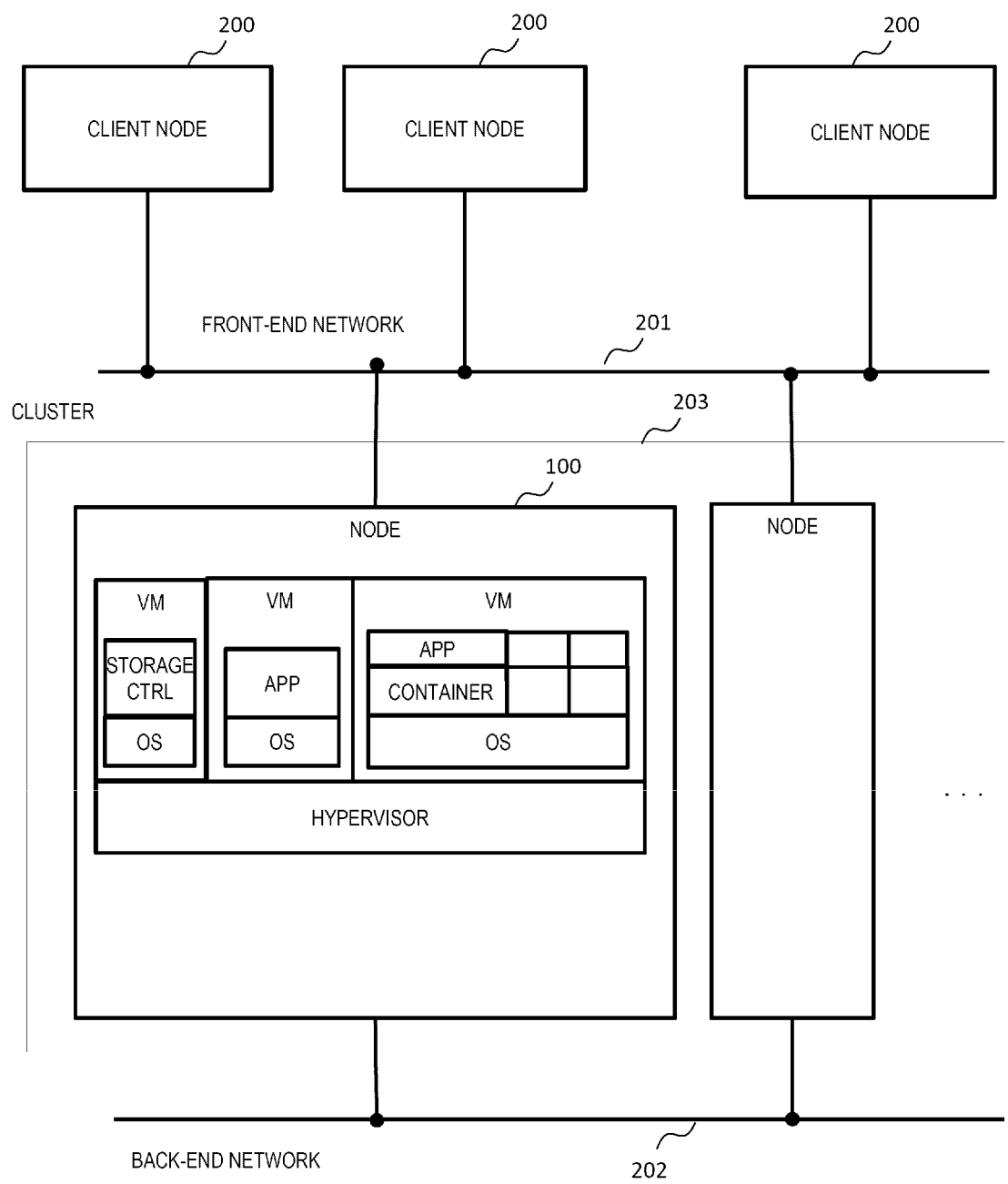
FIG. 2 is an overall configuration diagram of a system.

FIG. 2 is an overall configuration diagram of the system. As shown in FIG. 2, generally, a cluster 203 is configured by the plurality of nodes 100, and is connected to a client node 200 via a front-end network 201. The plurality of nodes 100 configuring a cluster are connected via a back-end network 202. However, the front-end network 201 and the backend network 202 may be configured by the same network, and a plurality of nodes may be connected by a management network in addition to the front-end network 201 and the back-end network 202.

In each node 100, a hypervisor is operated, and a storage controller, an application, and a container are operated on a VM created on the hypervisor.

Figure 3:
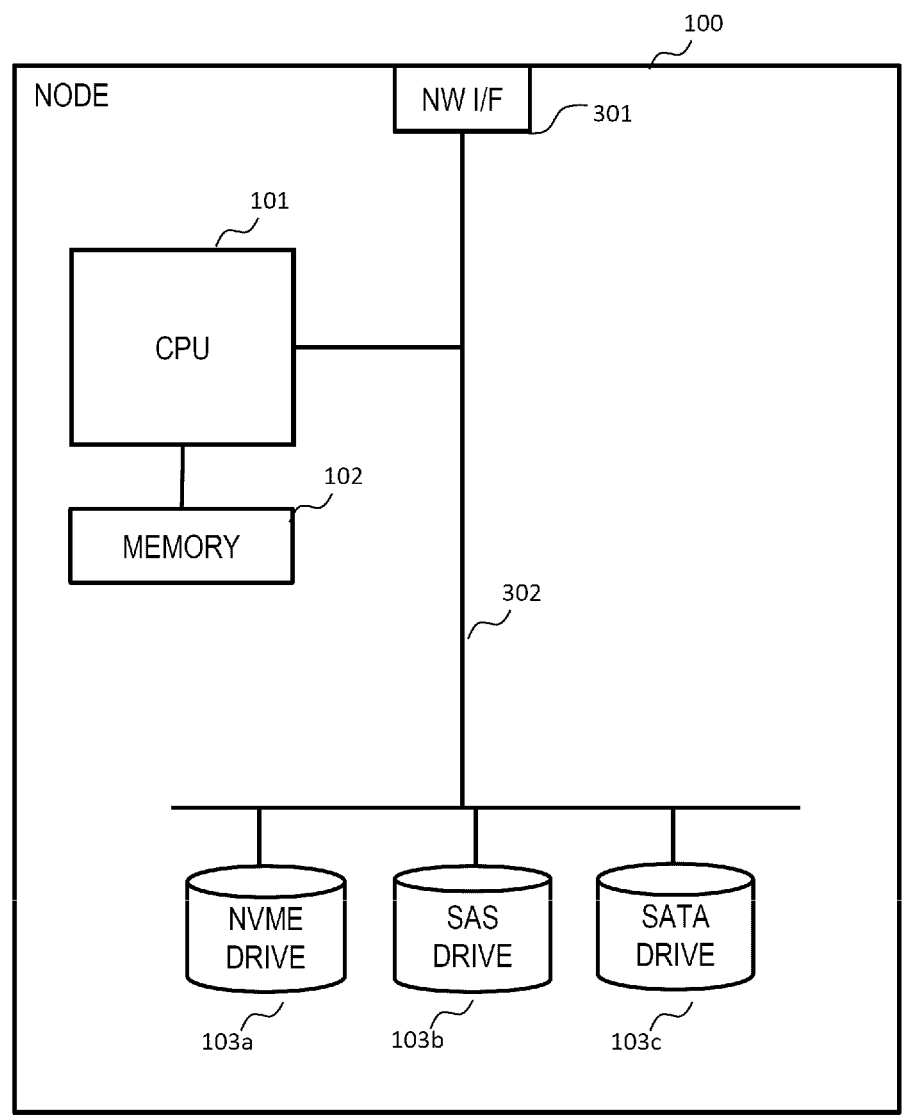
FIG. 3 is a hardware configuration diagram of a node.

FIG. 3 is a hardware configuration diagram of a node of the node 100. As shown in FIG. 3, the nodes 100 have the same configuration as a configuration of a general-purpose server, which is configured by the CPU 101, the memory 102, an NVMe drive 103*a* serving as a storage device, an SAS drive 103*b*, an SATA drive 103*c*, and an internal bus 302 that connects the above components. A network I/F 301 is further included to transmit data to and receive data from an external device. A plurality of CPUs 101 and memories 102 may be provided. The drive may be a non-volatile memory (SCM) or an optical drive. The network I/F 301 may be a fiber channel (FC), an Ethernet (registered trademark), an InfiniBand, or a different type of network.

Figure 4:
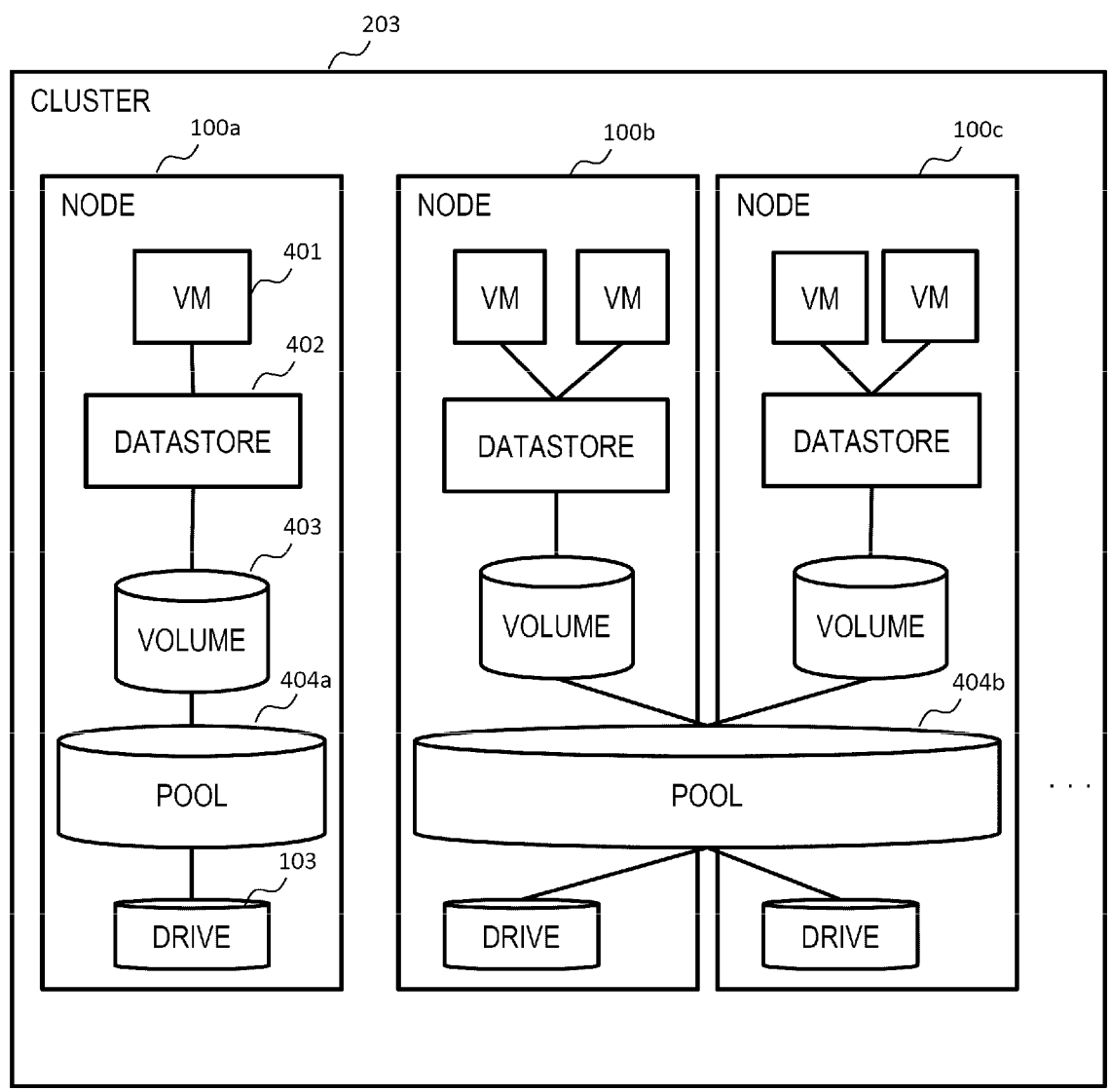
FIG. 4 shows a logical configuration of a cluster using a plurality of nodes.

FIG. 4 shows a logical configuration of a cluster using a plurality of nodes. One or more pools 404 are provided in the cluster. The pool virtually manages a capacity of the physical drive 103. The pool includes an in-node pool 404*a* that handles only drives in the node and a spanning pool 404*b* that also manages drives of other nodes. Further, for ease of management, for example, a plurality of in-node pools may be combined and managed as a hierarchical structure so as to serve as a spanning pool.

A physical storage area of the pool divides the drive 103 into predetermined small areas and manages the divided areas in units of division. A volume 403 is created by being curved from the pool. When Thin Provisioning technology is used, in response to a write request to the volume 403, a physical storage area from the pool 404 is assigned with a volume, so that a write processing is executed thereto. The volume can also be formed by directly assigning a physical storage area of the drive 103 without defining the pool.

A data store 402 is created from the volume 403. The data store 402 is a volume that stores data of a virtual machine (VM), which stores configuration information and an OS of the VM. A VM 401 is created from the data store 402.

Relationships between the numbers of volumes, data stores, and VMs are not particularly limited, and can be, for example, volumes:data stores:VMs=1:1:1 or 1:1:N (N is a positive integer). These relationships are managed by a storage management program 502, which will be described below.

Figure 5:
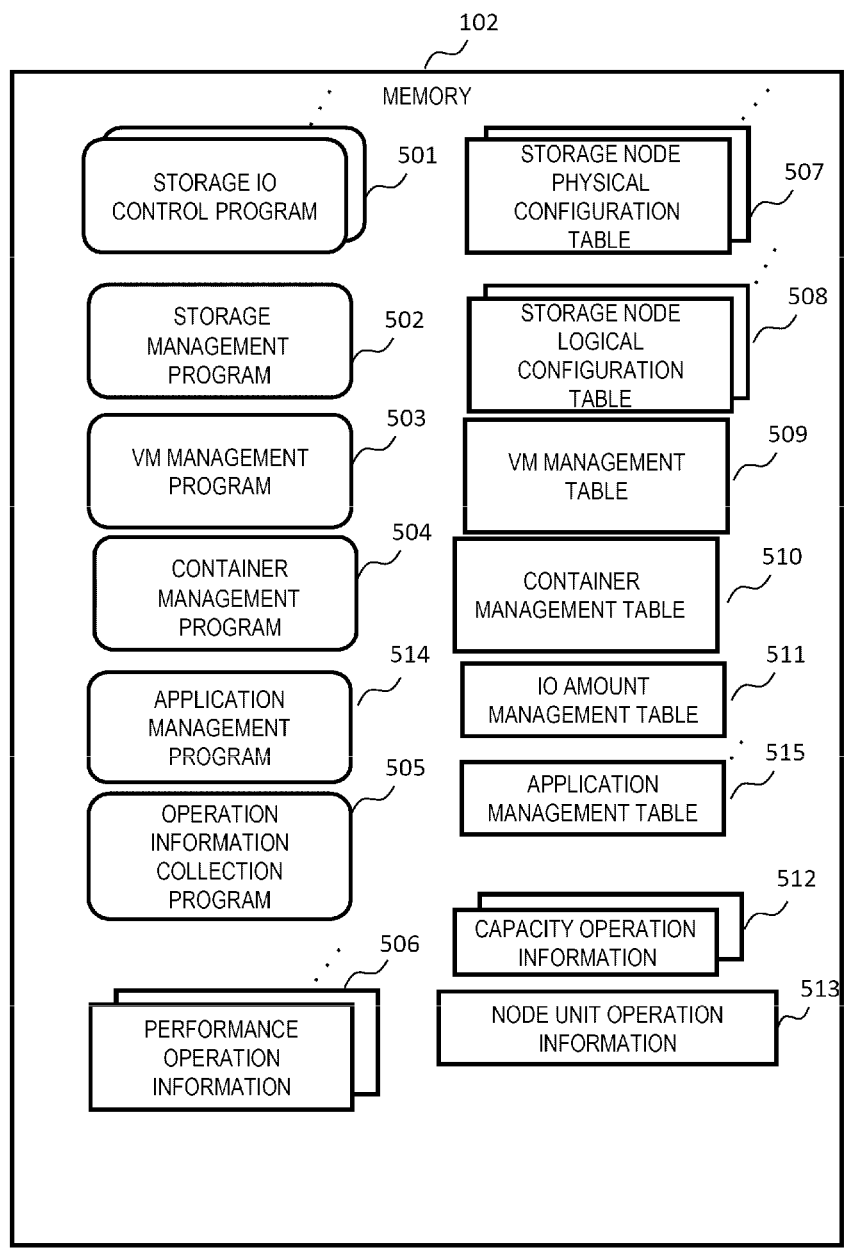
FIG. 5 shows various programs and control information stored in a memory of a node.

FIG. 5 shows various programs and control information stored in the memory 102 of the node 100.

The various programs include a storage IO control program 501, a storage management program 502, a VM management program 503, a container management program 504, an application management program 514, and an operation information collection program 505.

The various types of control information include a storage node physical configuration table 507, a storage node logical configuration table 508, a VM management table 509, a container management table 510, an IO amount management table 511, an application management table 515, performance operation information 506, capacity operation information 512, and node unit operation information 513.

The storage IO control program 501 controls IO with respect to a volume provided to a VM/container (may be referred to as a storage VM or a storage controller). In addition, IO between the storage controllers and the nodes is also controlled. An IO amount controlled by the storage IO control program is measured.

The storage management program 502 implements creation of the pool 404 and the volume 403, and manages storage resources.

The VM management program 503 creates the data store 402 and the VM 401, and migrates the VM to a different node.

The container management program 504 creates and manages containers. This function is included in Linux (registered trademark).

The application management program 514 manages applications operating on the VM.

The storage node physical configuration table 507 manages information indicating physical resources, such as a CPU, a memory, a drive, and a port, of each node 100. Details will be described with reference to FIG. 6.

The storage logical configuration table 508 manages information indicating a logical storage configuration, such as a pool and a volume, of the node. Details will be described with reference to FIG. 10.

The VM management table 509 is information for managing configurations of the node, the volume, and the VM, and the physical resource assigned to the VM. Details will be described with reference to FIG. 7.

The container management table 510 is information for managing resources associated with the VM and the container, and resources assigned to the container. Details will be described with reference to FIG. 8.

The operation information collection program 505 implements a function of periodically collecting various types of operation information such as an IO amount, a performance, and a capacity. Functions of a general VM management software and hypervisor management software are used for a collection processing of the performance and the IO amount of the VM, and general functions (such as sar) attached to the OS are used for the node. A general storage management information acquisition function is used for a capacity collection processing.

The IO amount management table 511 is information for managing a read/write amount of each VM according to time series. Details will be described with reference to FIG. 12.

The application management table 515 is information related to applications operating on the VM. Details are shown in FIG. 9.

The performance operation information 506 indicates a use amount of resources used by each node and VM. Details are shown in FIG. 13.

The capacity operation information 512 indicates capacities of storage resources and the VM in time series. Details are shown in FIG. 11.

The node unit operation information 513 indicates a use state of computer resources, such as a CPU and a memory of each node, used by the VM/container. Details are shown in FIG. 14.

An allocation condition table of storage controllers that cannot be allocated at the same node, for a reason of ensuring redundancy of data between the nodes, may be included as control information.

These tables may be always copied at all nodes to hold the same information, or may be held only at one or more nodes determined in advance. In addition, information about each node may be distributed and held in each node. The storage management program 502, the VM management program 503, and the container management program 504 may be operated in cooperation at each node, or one representative program may be operated among all the clusters to manage all the clusters. In addition, an allocation destination node of the VM, the container, and the volume can be determined by storing the node unit operation information 513 and the storage node logical configuration table 508 in a management server (not shown) different from the node and operating the storage management program 502, the VM management program 503, the container management program 504, and the application management program 514. In this specification, the allocation destination node of the VM, the container, and the volume is determined by a management unit implemented by the storage management program 502, the VM management program 503, the container management program 504, and the application management program 514 based on the node unit operation information 513 and the storage node logical configuration table 508. That is, the management unit is implemented in a management server or at least one of the plurality of nodes.

Example 1 shows an example in which a representative program is operated in one node.

<Various Control Information>

FIG. 6 shows a content of the storage node physical configuration table 507 stored in the memory 102 of the node 100. The storage node physical configuration table 507 is managed by the storage management program 502 and is referred to by the storage IO control program 501.

The storage node physical configuration table 507 includes a node physical resource table 601, a CPU physical resource table 602, a drive physical resource table 603, and a port physical resource table 604.

The node physical resource table 601, with respect to a node ID 6011, which is an identifier for uniquely identifying the nodes, manages: CPU_IDs 6012, which are identifiers for uniquely identifying the CPUs of each node; memory 6013 indicating a memory amount; a disk_ID 6014 for uniquely identifying disks constituting the drive; and port_IDs 6015 for uniquely identifying the ports of the node. For example, a node ID "1" includes: a CPU specified by a CPU_ID "1"; a memory having a memory amount of "100"; a drive having a disk_ID "1"; and a port having a port ID "1". Accordingly, a physical configuration of each node (storage) is managed.

The CPU physical resource table 602, with respect to a CPU_ID 6021 for uniquely identifying a CPU, manages: the number of cores 6022 and a frequency 6023 of each CPU, and a node_ID 6025 indicating an association between each CPU and the nodes. The CPU may be managed with a different ID for each core. For example, it is shown that the CPU indicated by a CPU_ID "1" has the number of cores "1" and a frequency of "1" GHz, and is allocated at the node "1".

The drive physical resource table 603, with respect to a disk_ID 6031 for uniquely identifying a disk, manages: a capacity 6032 of each disk, a type 6033 of the drive, and a node_ID 6035 which is information of association between each disk and the nodes.

The port physical resource table 604, with respect to a port ID 6041 for uniquely identifying a port, manages: a type (FC, iSCSI, etc.) 6042, a speed 6043 of each port, and a node_ID 6045 which is information of association between each port and the nodes. Each ID above may be a number or a string. Although a table format is described in FIG. 6, if relationships between each item can be managed, values thereof may be held in other formats, such as a document format.

FIG. 7 shows a content of the VM management table 509 stored in the memory of the node. This control information is managed by the VM management program 503.

The VM management table 509, with respect to an identifier VM_ID 7011 for uniquely identifying the VM, correspondingly manages a node_ID 7012 indicating the node in which the VM is allocated, and a data store_ID 7013 for uniquely identifying the data store corresponding to the VM. A role 7014 indicates the role of the VM. For example, values such as "storage control/management", "VM management", "container management", and "user application" may be taken. The "storage control/management", the "VM management", and the "container management" may be collectively referred to as "cluster management", for example.

In addition, computer resources assigned to the VM, including IDs of the CPU, the memory amount, and if necessary, the disk constituting the drive, the port, and the volume are managed in columns 7015 to 7019.

For example, the VM indicated by the VM_ID "1" is allocated at the node_ID "1", the role of the VM is "storage control and management", and the CPU_ID 7015 is "1".

The CPUs may be managed in separate columns for each core. Specific values of the information of the computer resources assigned to each VM, in addition to the IDs, may be held. Values may be held in other formats, such as a document format, as well as in a table format as shown in FIG. 7. The IDs such as the VM_ID may be a number or a string.

FIG. 8 shows the container management table 510 stored in the memory of the node. The container management table 510, with respect to an identifier container ID 8011 for uniquely identifying the container, manages a VM_ID 8012 for identifying the VM, an IP address 8013, an ID and a memory amount of a CPU which is a computer resource assigned to the container. The IP address may be IPv4 or IPv6. In addition, instead of the IP address, a WWN for performing FC communication or identification information for communicating with another protocol may be used. Values of the container management table 510 may be held in other formats, such as a document format, in addition to a table format shown in FIG. 8. The container ID may be a number or a string. For example, the VM_ID "1", a CPU_ID "3", and a memory amount "50" correspond to a container ID "1".

FIG. 9 shows a content of the application management table 515. This information is managed by the application management program 514. A VM_ID 902 for identifying the VM (container), a node_ID 903, and utilization 904 are managed, with respect to an App_ID 901 for uniquely identifying the application. In addition to a table format shown in FIG. 9, values may be held in other formats, such as a document format. The container ID may be a number or a string. For example, the VM_ID "1", the node_ID "1", and the utilization "storage controller" are managed in correspondence with respect to App_ID "1".

FIG. 10 shows the storage node logical management table 508 stored in the memory of the node. The storage node logical management table 508 includes pool configuration information 1001 and volume configuration information 1002. The storage node logical management table 508 is a table showing logical storage resources such as the pool and the volume. There is a table for each resource. Here, as a typical example, an example of the pool and the volume is shown.

In the pool configuration information 1001, a pool capacity 10012, a pool name 10013, an ID 10014 of a node at which the pool is allocated, a redundancy type 10015 of a mirror or EC (Erasure Coding) pool, and a redundancy destination node ID 10016 are managed with respect to a pool ID 10011 for uniquely identifying the pool in the system.

The volume configuration information 1002, with respect to a volume ID 10021 for identifying the volume, indicates information such as a volume name 10022, a volume capacity 10023, a block number 10024, an ID 10025 of a pool to which the volume belongs, an ID 10026 of a node to which the pool belongs, an ID 10027 of a data store associated with the volume, an ID 10028 of the VM created from the data store, and an ID 10029 of an associated container. Values may be held in other formats, such as a document format, in addition to a table format shown in FIG. 9.

FIG. 11 shows the capacity operation information 512 stored in the memory of the node, which shows time series information of resources having capacities among the storage resources and the VMs. The capacity operation information 512 manages a use state of a storage capacity configured by a storage device.

Pool capacity operation information 1101 is managed when a management target is the pool. The pool capacity operation information 1101 manages information such as a total capacity 11012 of the pool, time 11013 and a use amount 11014 at each time, with respect to a pool ID 11011 for uniquely identifying the pool in the system.

Volume capacity operation information 1102 is managed when the management target is the volume. The volume capacity operation information 1102 manages information such as a volume capacity 11022, time 11023 and a use amount 11024 at each time, with respect to a volume ID 11021 for uniquely identifying the volume in the system.

VM capacity operation information 1103 is managed when the management target is the VM. The VM capacity operation information 1103 manages information such as a VM capacity 11032, time 11033 and a use amount 11034 at each time, with respect to a VM ID 11031 for uniquely identifying the VM in the system. Values of each of the information may be held in other formats, such as a document format, instead of a table format as shown in the figures.

Application capacity operation information 1104 is managed when the management target is the application. Information such as an application_ID 11041 for uniquely identifying the application in the system, a capacity 11042, time 11043 and a use amount 11044 at each time are managed.

FIG. 12 shows the management table 511 of the IO amount of each VM stored in the memory of the node, which indicates time series information of the I/O amount of Read/Write of the VM. The management table 511 of the IO amount of each VM manages, in correspondence, an IO type 1202 indicating whether the IO is read or write; time 1203; and an IO amount 1204 at a certain interval, with respect to a VM_ID 1201 for uniquely identifying the VM. The IO type may be distinguished by Sequential R/W and Random R/W. The information is recorded by the VM management program 503 provided as general VM management software. Although FIG. 12 shows an example in which the IO amount is managed for each VM, the IO amount may be managed in units of containers. In addition, values may be held in other formats, such as a document format, in addition to a table format shown in FIG. 12.

FIG. 13 shows the performance operation information 506 stored in the memory of the node, which shows a use amount of resources used by each node or VM. The information is referred to and updated by the operation information collection program 505. Node performance operation information 1301 manages: metrics 13012 of a CPU use rate, a memory use amount, and a used bandwidth; time 13013; and the CPU use rate, the memory use amount, and the used bandwidth at a certain interval 13014, with respect to a node ID 13011 for uniquely identifying the node.

VM performance operation information 1302 manages: metrics 13022 of a CPU use rate, a memory use amount, and a used bandwidth; time 13023; and the CPU use rate, the memory use amount, and the used bandwidth at a certain interval 13024, with respect to a VM_ID 13021 for uniquely identifying the VM. The node performance operation information 1301 and the VM performance operation information 1302 may hold other information (such as a memory Write Pending Rate). Similar performance operation information may be managed for each container and for each application. In addition, values may be held in other formats, such as a document format, in addition to a table format shown in FIG. 13.

An allocation condition table can also be included as other control information. For example, with respect to the VM_ID, an allocation condition for each VM manages: a type ID for identifying a type of the VM; a type indicating the type of the application, such as NoSQL DB; and conditions such as being not allocated in the same node as the volume nor in the same node with a VM of the same type. Type information is used so as not to create items with the same type ID in the same node under the condition. Conditions such as the VM and the volume are necessarily present in the same node (or the volume and the VM may not be in the same node), and VMs of the same type is allocated at different nodes, are set. These conditions may be set by a user via the VM management program at the time of VM deployment, or may be written in a setting file so as to be automatically set by the application.

FIG. 14 shows the node unit operation information table 513 stored in the memory of the node. The use state of the computer resources such as a CPU, a memory, and an NW bandwidth for each VM/container and each application is managed in units of nodes. Although in the figure, the VM_ID is managed as examples of the VM, a container_ID which sets the container as a target and an application_ID which sets the application as a target may also be managed.

The node unit operation information table 513 is information for managing the use state of the computer resources shared by the virtual machine and the storage controller operating on each node.

The storage management program 502 periodically creates information of the storage node physical configuration table 507 of FIG. 6, the capacity operation information 512 of FIG. 11, the IO management table 511 of FIG. 12, the performance operation information 506 of FIG. 13, and the VM management table 509 of FIG. 7 (the container management table of FIG. 8 in the case of the container, and the application management table of FIG. 9 in the case of the application). In the example, information of a latest time is extracted and saved from a history of the operation information in FIGS. 11, 12, and 13. However, not only the latest information but also the history information may be saved. Although information of each VM is described in the example, information of each container and of each application may also be managed.

For example, a physical computer resource such as the CPU_ID of each node can be specified from the storage node physical configuration table 507 of FIG. 6. Accordingly, a CPU upper limit 1402, memory upper limit 1404, and NW bandwidth upper limit 1406 of each node can be grasped. Each VM and node, and correspondence of the physical computer resource such as the CPU_ID can be from the VM management table 509 of FIG. 7. Accordingly, correspondence between a node_ID 1401 and a VM_ID 1410 becomes clear.

Since the capacity of each VM and the use amount at each time can be specified from the capacity operation information 512 of FIG. 11, a capacity use amount 1414 of each VM is grasped from the capacity upper limit 11032 and the use amount 11034 with respect to the VM_ID. A volume capacity assigned to each VM can be grasped by the volume configuration information 1002 of FIG. 10 that manages the correspondence between the VM and the volume. An IO amount 1415 of each VM can be grasped from the IO amount management table 511 of FIG. 12. A CPU use amount 1411, a memory use amount 1412, and an NW bandwidth use amount 1414 can be grasped for each VM from the VM performance operation information 1302 of FIG. 13.

That is, the upper limits 1402, 1404 and 1406 of the computer resources managed for each node, the capacity upper limit 1408, and the use states 1411 to 1415 managed for each VM are grasped. The volume capacity assigned to each VM can also be grasped from the volume configuration information shown in FIG. 10. As for the VM arranged at each node, the VM allocated at each node can be grasped by the VM management table of FIG. 7.

Therefore, through comparing the upper limit values of the computer resources (CPU, memory, bandwidth and capacity) allocated at each node with a sum of the computer resources and the volume capacities used by the VMs, a correspondence table shown in FIG. 14 is managed, and the use state (capacity use amount/rate) of the computer resources, such as CPUs, memories and NW bandwidths, used in each node and the storage capacity, configured by the storage device, can be grasped.

Although information of each VM is described in FIG. 14, information of each container and each application may also be managed. In addition, values may be held in other formats, such as a document format, other than a table format.

<Allocation Determination Processing of VM/Container and Volume>

Figure 15:
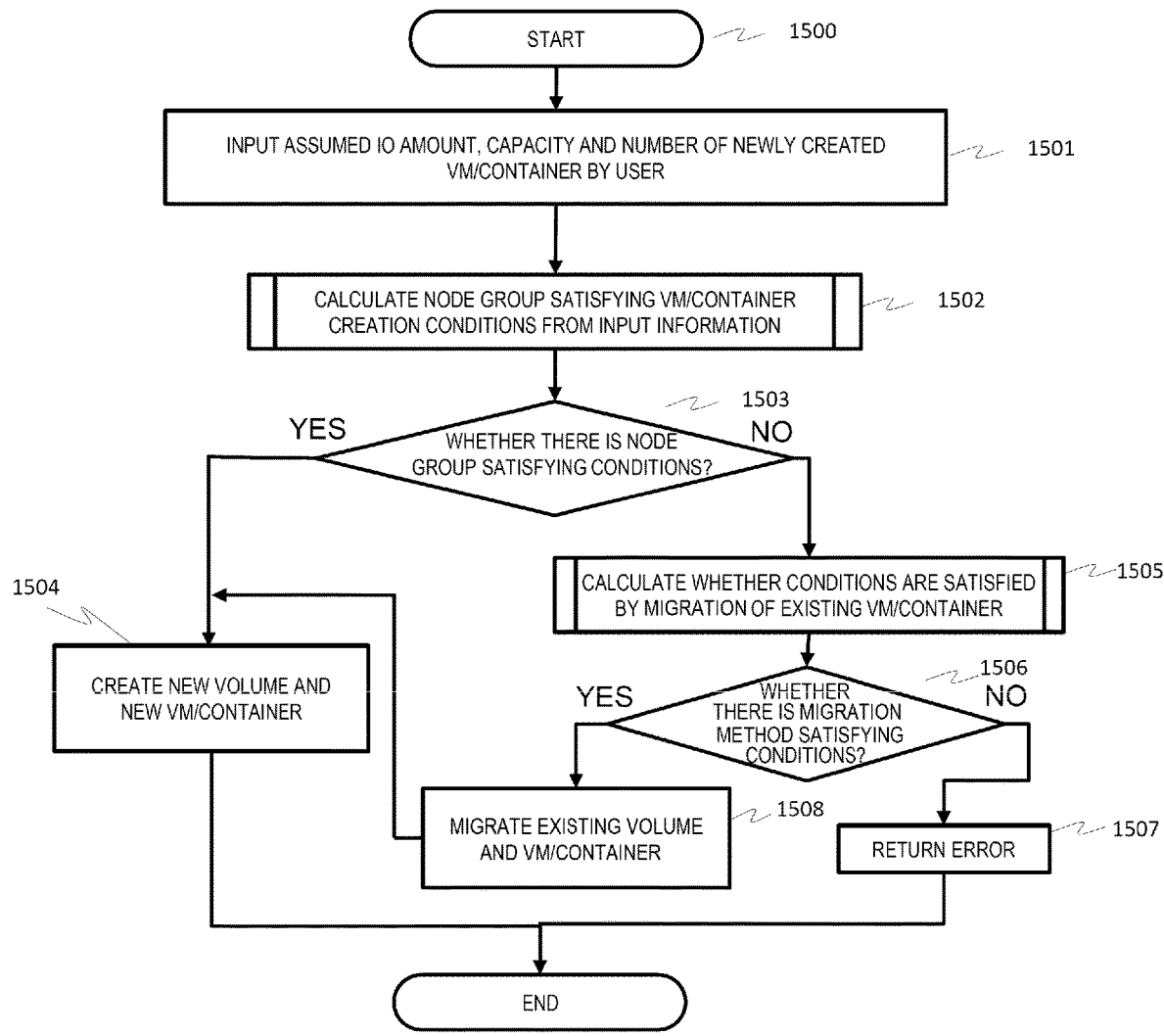
FIG. 15 is a processing flow diagram of determining allocation of a newly created VM/container and volume.

FIG. 15 is a processing flow diagram of determining allocation of a newly created VM/container and volume. This processing is a case where a user, who is an administrator, inputs an assumed IO amount and volume conditions of the newly created VM/container and allocates the VM/container, without considering a redundancy type of an IO. Although the processing illustrated in FIG. 15 is mainly processed by the storage management program 502 of the management unit, processing of Steps 1508 and 1504 is performed by the VM management program 503 when a new VM is created, and by the container management program 504 when a new container is created.

First, in Step 1501, the user inputs an assumed IO amount and a capacity of the newly created VM/container, and the number of the VM/container to be created.

Next, in Step 1502, a node group satisfying creation conditions of the VM/container is calculated from the input information. This processing will be described in detail with reference to FIG. 16.

Next, in Step 1503, it is determined whether there is a node group that satisfies the conditions, and if there is such a node group, the process proceeds to Step 1504 to create a new volume and a new VM/container in the node group that satisfies the conditions.

If it is determined in step S1503 that there is no node group that satisfies the conditions, the process proceeds to step S1505 to calculate whether the conditions can be satisfied by migration of an existing VM/container. This step will be described in detail with reference to FIG. 17.

In step S1506, it is determined whether there is a migration method that satisfies conditions of content calculated in step S1505. If there is a migration method that satisfies the conditions, the process proceeds to step S1508 to migrate an existing volume and an existing VM/container to another node. After the creation conditions are satisfied in step S1508, the processing of step S1504 is executed to create the new volume and the new VM/container.

If it is determined in step S1506 that there is no migration method that satisfies the conditions, an error is returned (S1507), and the process is ended.

In FIG. 15, as for the input information of the user, not only the IO amount but also other values such as a memory use amount may be input as an assumed load.

Figure 16:
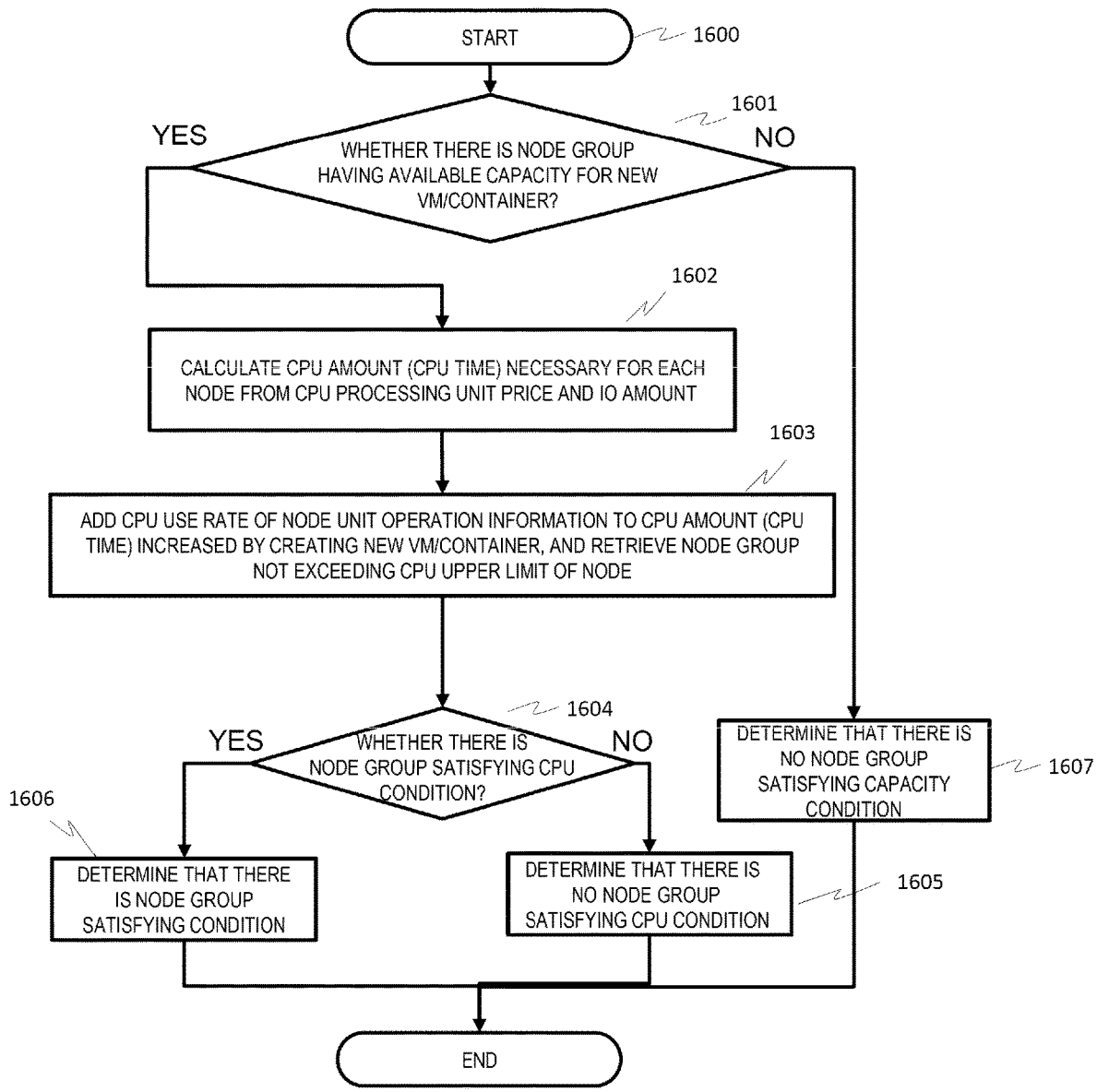
FIG. 16 is a flow diagram of calculating a node group satisfying a VM/container creation condition.

FIG. 16 is a flow diagram showing a processing of calculating the node group satisfying the VM/container creation conditions. The processing shown in FIG. 16 corresponds to the processing in step S1502 in FIG. 15, and is executed by the storage management program 502 of the management unit.

First, the storage management program 502 refers to the capacity upper limit 1408 and a capacity use amount 1409 of node unit operation information 1400 shown in FIG. 14 to determine whether there is a node group having an available capacity (capacity of the storage area) for the new VM/container (S1601). In this processing, if there is no such node group, it is determined that there is no node group that satisfies a capacity condition (S1607).

Next, a CPU amount (CPU time) necessary for each node is calculated from a CPU processing unit calculation cost and the IO amount (S1602). Here, the CPU processing unit calculation cost is a value obtained by dividing a CPU time required for IO processing by the IO amount, and is defined as a CPU use time necessary for processing one IO.

Next, a CPU use rate 1403 of the node unit operation information is added to an increased CPU amount (CPU time) for creating the new VM/container, and a node group not exceeding the CPU upper limit 1402 of the node is retrieved (S1603). If there is a node that satisfies a CPU condition of step S1603 as a result of the retrieval, the process proceeds to Step 1606 to determine whether there is a node group that satisfies the condition. If there is no node that satisfies the CPU condition of step S1603, the process proceeds to step S1605, to determine that there is no node group that satisfies the CPU condition.

As described above, the new VM or the like can be created in a node having a surplus capacity and a surplus CPU, which is a computer resource.

Check of the capacity condition may be omitted when the volume is Thin Provisioning (using a virtual capacity). The CPU processing unit calculation cost may have a fixed value or may be calculated from a CPU core frequency of the node. Although in this example, the CPU use amount is calculated by calculating the CPU amount (CPU time) through multiplying the CPU processing unit calculation cost by the IO amount, other methods may also be used. In the retrieval processing, a dynamic programming method or the like may be used to obtain one solution, and a condition check processing may be repeated. Even if a node group having a lowest use rate is detected after performing a full retrieval, the group may be narrowed down by the check processing.

Not only the check of the CPU condition but also a check of the memory amount and a check of the communication bandwidth, necessary for the I/O processing, may be performed.

Figure 17:
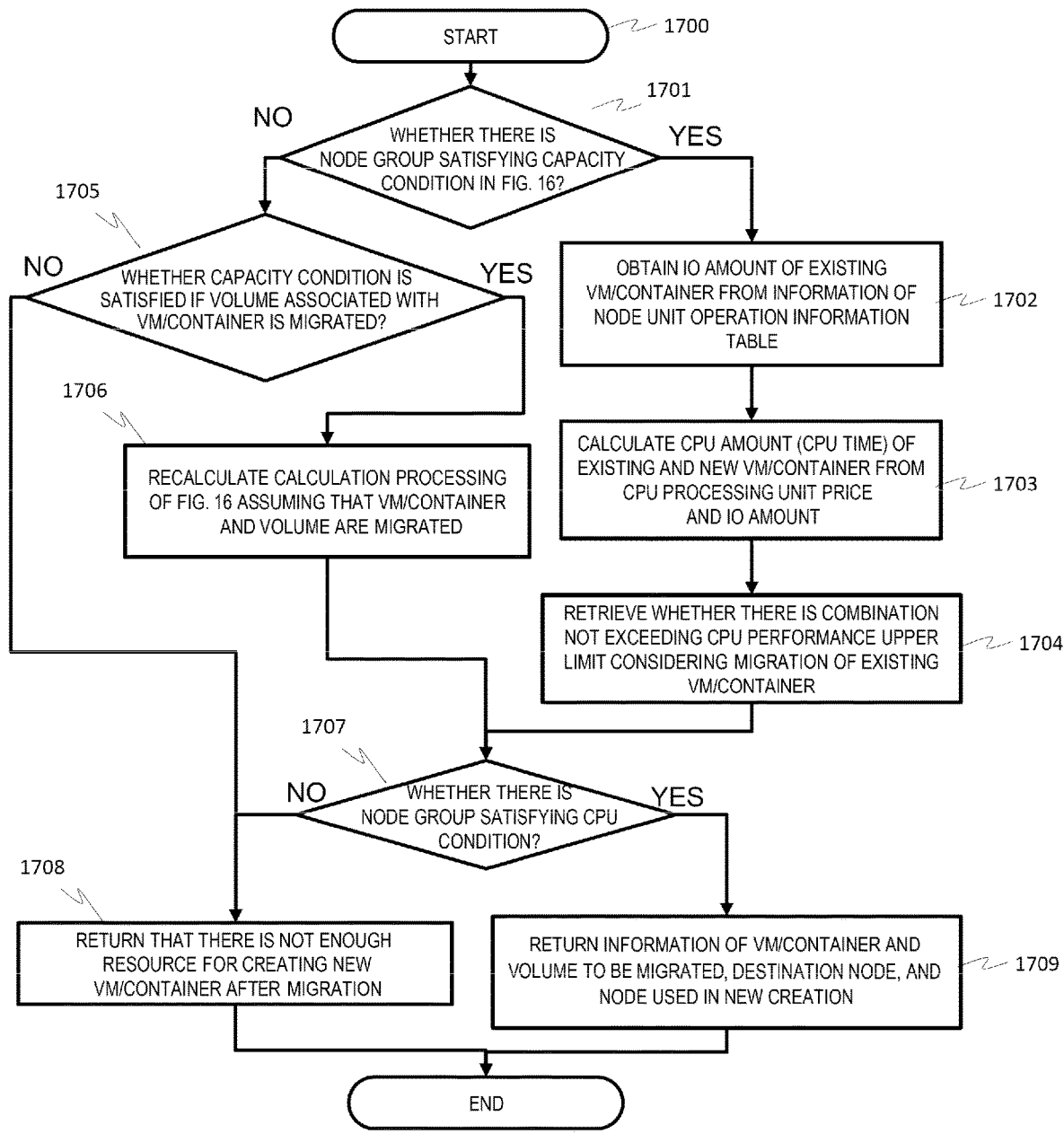
FIG. 17 is a flow diagram of calculating whether a condition is satisfied by migration of an existing VM/container.

FIG. 17 is a flow diagram showing whether a condition is satisfied by migration of an existing VM/container. The processing shown in FIG. 17 corresponds to the processing in step S1505 in FIG. 15, and is executed by the storage management program 502 of the management unit.

In the processing of FIG. 16, when it is determined that there is a node group satisfying the capacity condition, the process proceeds to step S1702 to obtain an IO 1405 amount of an existing VM/container from information of the node unit operation information table. Next, a CPU amount (CPU time) of the existing and new VM/container is calculated from the CPU processing unit calculation cost and the IO amount (S1703). Here, the CPU processing unit calculation cost is a value obtained by dividing a CPU time required for IO processing by the IO amount, and is defined as a CPU use time necessary for processing one IO.

Next, in consideration of the migration of the existing VM/container, it is retrieved that whether there is a combination not exceeding the CPU performance upper limit (S1704), and it is determined whether there is a node group satisfying the CPU condition (S1707). As a result of the determination, when there is a node group satisfying the CPU condition, information of the VM/container and a volume to be migrated, a destination node thereof, and the node used in the new creation is returned (S1709).

If it is determined in the processing of FIG. 16 that there is no node group that satisfies the capacity condition, the process proceeds to step S1705 to determine whether the capacity condition is satisfied if a volume associated with the VM/container is migrated (S1705). If a determination result of S1705 is negative, a fact that there is not enough resource for creating the new VM/container after migration is returned (S1708). If it is determined in S1705 that the capacity condition is satisfied by migrating the volume associated with the VM/container, the calculation processing of FIG. 16 is recalculated, assuming that the VM/container and the volume are migrated (S1706). After that, the process proceeds to step S1707, where the CPU condition is determined, and processings of step S1708 and step S1709 are executed in accordance with the determination result.

In this way, processing of FIG. 17 shows a method for creating a new VM or the like on a node. In the method, even when there is no available capacity to create the new VM or the like in a computer resource or a capacity, an existing VM or the like is migrated, computer resources and capacities are appropriately allocated among nodes, and a spare capacity is thus generated in the computer resource by migrating the existing VM.

In FIG. 17, when the calculation processing of FIG. 16 is recalculated, the VM/container and volume to be migrated and the VM/container and volume to be created are all considered as newly created ones in the calculation. Resources used by the migrated VM/container/volume are subtracted from a current use amount. When a plurality of combinations are retrieved in consideration of the migration, an additional retrieval for narrowing down the combinations may be performed so as to migrate an existing VM/container whose current I/O amount is low, in consideration of influence thereof on the current system. Not only the check of the CPU condition but also a check of the memory amount and a check of the NW bandwidth, necessary for the I/O processing, may be performed.

As shown in FIGS. 15 to 17, based on information of the existing VM/container, the new VM/container can be created with the allocation condition being satisfied and without exceeding the upper limit of the CPU amount of the node. In addition, the new volume can also be created with the CPU amount of the node, the allocation condition, and the capacity condition being satisfied. Even when no node satisfies the condition of the newly created VM/container or volume, an existing VM/container or volume can be migrated so as to satisfy the condition when there is a node whose computer resource can be ensured to satisfy the condition as a result of migrating the existing VM/container or volume.

The creation of the VM/container and the volume, and the migration of the existing VM/container or volume are executed by a management server or a management unit of a representative node.

When an error is finally returned in the processing of FIG. 15, the administrator of the system can perform a processing of adding a new node to the system in order to increase the physical resource of the computer. Anode is added only when an additional node is necessary in order to increase the physical resource of the computer, thereby enabling efficient system operation.

Example 2

Figure 18:
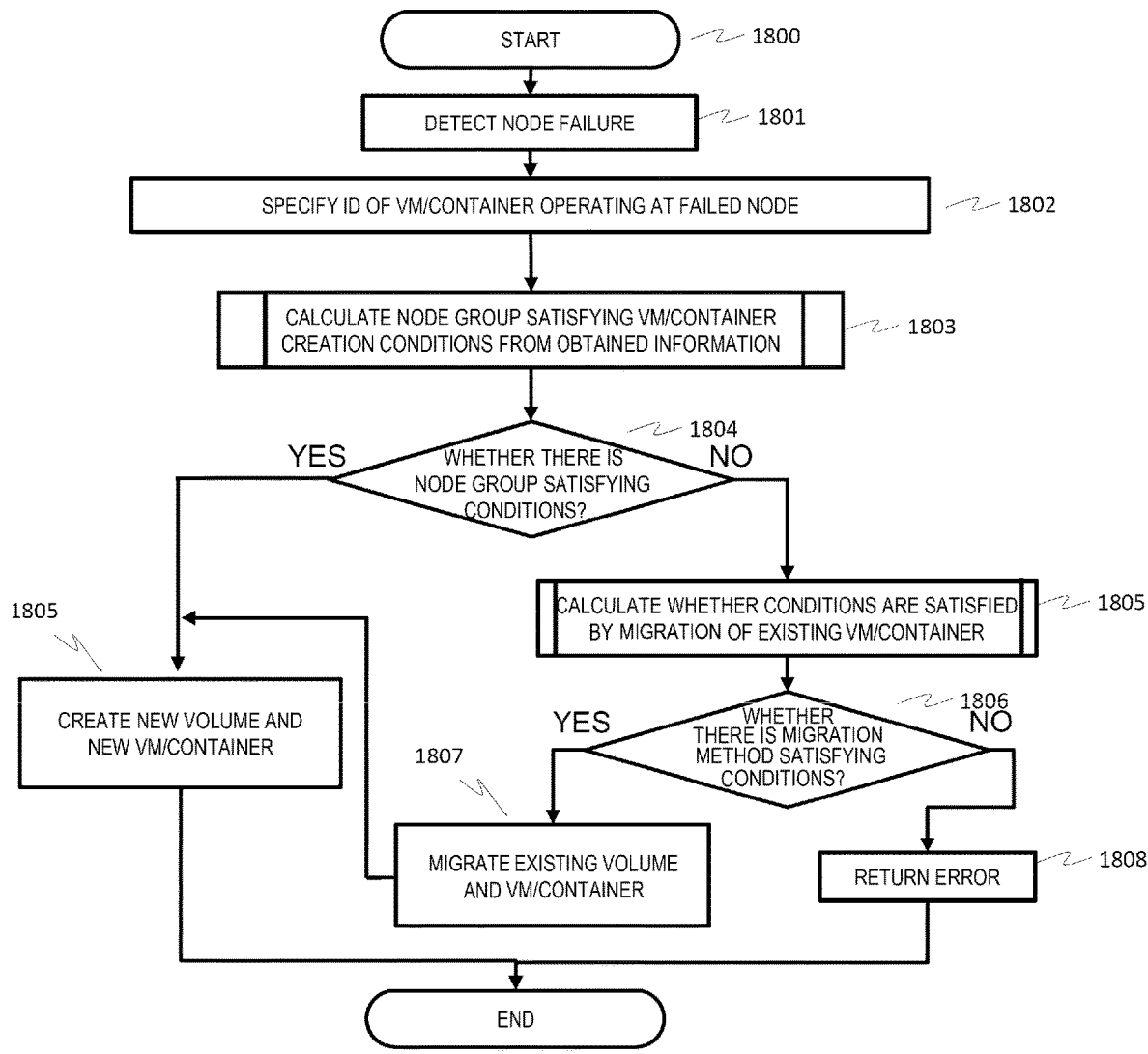
FIG. 18 is a flow diagram of determining allocation of a VM/container and volume when a node failure occurs according to Example 2.

FIG. 18 is a flow diagram of determining allocation of a VM/container or volume when a node failure occurs according to Example 2. The processing shown in FIG. 18 is executed by the storage management program 502 of the management unit, and can be understood as a modification of the processing in FIG. 15 of Example 1. This processing is a case where a VM/container operating at a node, in which a failure occurs, is made redundant again due to certain node failures. A case is considered as an example: there is a VM/container in which two redundant applications are operated at three nodes (N1, N2, N3) among five nodes (N1, N2, N3, N4, N5), when a failure occurs in N1, the applications are made redundant again somewhere in N2 to N5.

In the processing of FIG. 15 of Example 1, the assumed IO amount, the capacity, and the number of the VM/container to be newly created are input by the user in S1501. In contrast, the assumed IO amount, the capacity, and the number to be created of the failed node are grasped by detecting the node failure (S1801) and specifying an ID of the VM/container operating at the failed node (S1802), which is different from Example 1. Since processing from step S1803 to step S1808 is the same as step S1502 to step S1507 described with reference to FIG. 15, description thereof will be omitted. A processing of selecting a node satisfying the condition is executed, with the failed node being excluded from selection candidates.

According to Example 2, when the node failure occurs, a VM, a container, or a volume allocated on the node in which the failure occurs can be made redundant again, and a destination, where the VM/container or volume can be allocated, is calculated, without exceeding the computer resource of the node.

Example 3

Figure 19:
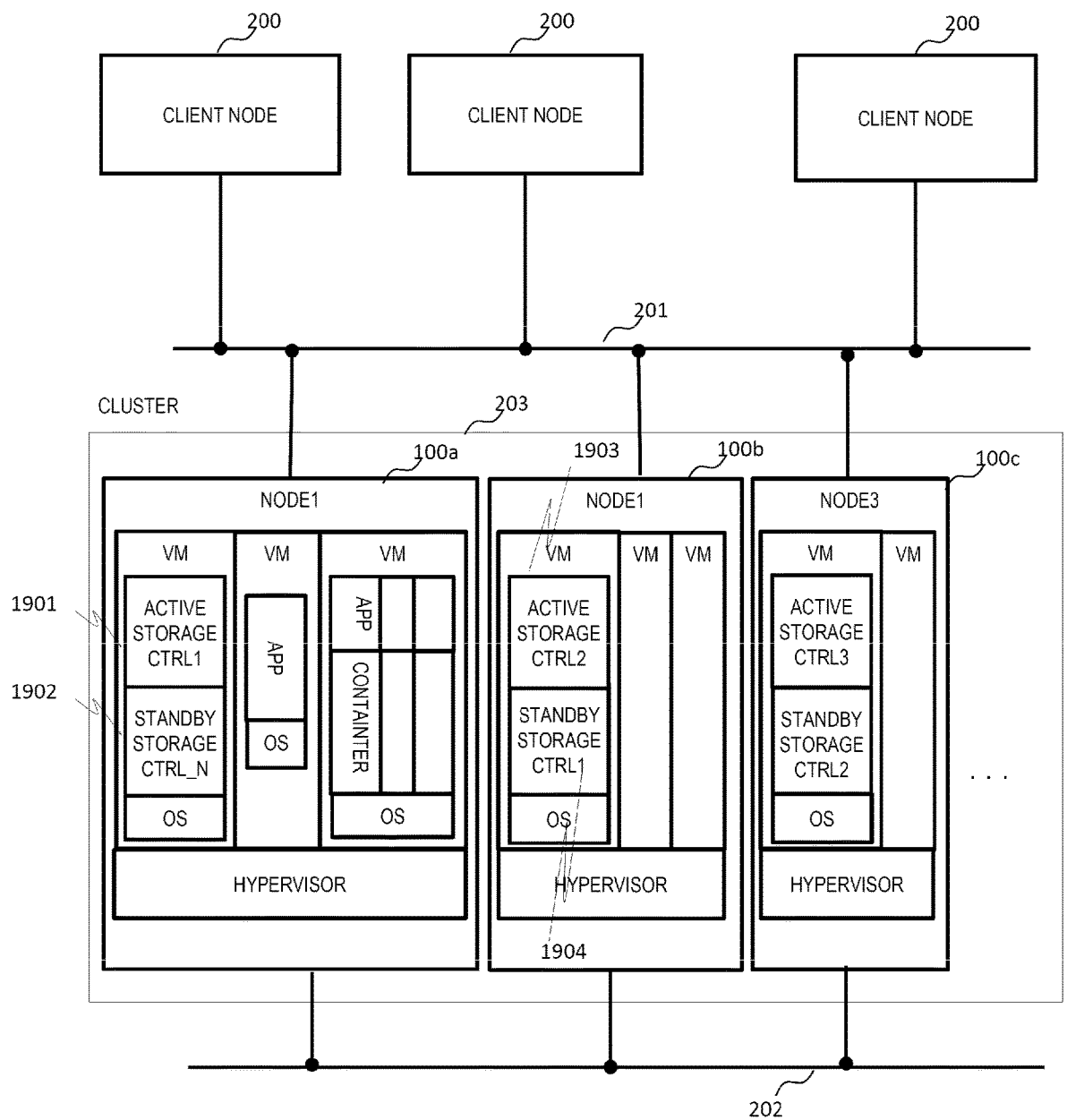
FIG. 19 shows a configuration in which a pair is formed by two storage controllers in two different nodes according to Example 3.

FIG. 19 shows a configuration according to Example 3 in which two storage VMs (two storage controllers 1901 and 1902 configured in one storage VM) are configured in two different nodes, and a pair is formed by two storage controllers (1901 and 1903) in each node.

Storage controllers (1901 and 1904) form a redundant configuration (redundant configuration between active and standby) between nodes. An active storage controller (1901) is always operated on at least one node. This example shows an example of active/standby.

When a failure occurs in a certain node, a standby storage controller corresponding to an active storage controller is promoted to an active storage controller to continue an IO processing (this is referred to as a failover). In the example of FIG. 19, when a failure occurs in a node 2 (100b), an active storage controller 2 is stopped, a standby storage controller 2 of a node 3 (100c) is promoted to active, and a processing of the active storage controller 2 is continued. In this case, since there are two active storage controllers in the node 3, a processing amount thereof is increased as compared with other nodes.

Data accessed via the active storage controller are made redundant at another node, and the standby storage controller is promoted after the failover, so that the data can access therethrough.

That is, the node 100a has a storage controller 1901 and a volume (not shown). The storage controller 1901 is active and processes an IO. That is, the storage controller 1901 operates in an active mode of processing an IO request for a volume from a virtual machine such as an application VM, and writes data to the volume.

In addition, the node 100b has a storage controller 1904 and a volume (not shown). The storage controller 1904 is in a standby mode to serve as a redundant configuration of the storage controller 1901, receives redundant data from the storage controller 1901 and writes the redundant data to the volume of the node 2 (100b).

FIG. 20 shows configuration information of a storage controller, such as a state of each storage controller, in addition to the information of FIG. 10 in Example 1. As in FIG. 10, the information is stored in the memory of the node, and is managed by the storage management program 502.

A storage controller configuration information 2000 is managed in correspondence with a state 2002 such as active/passive/standby, a group ID 2003 serving as an identifier of a pair, an operation node ID 2004 in which a storage controller is arranged, and a VM_ID 2005, with respect to an identifier 2001 for identifying the storage controller. A state indicating a failure (for example, dead) may also be held in the state 2002.

Figure 21:
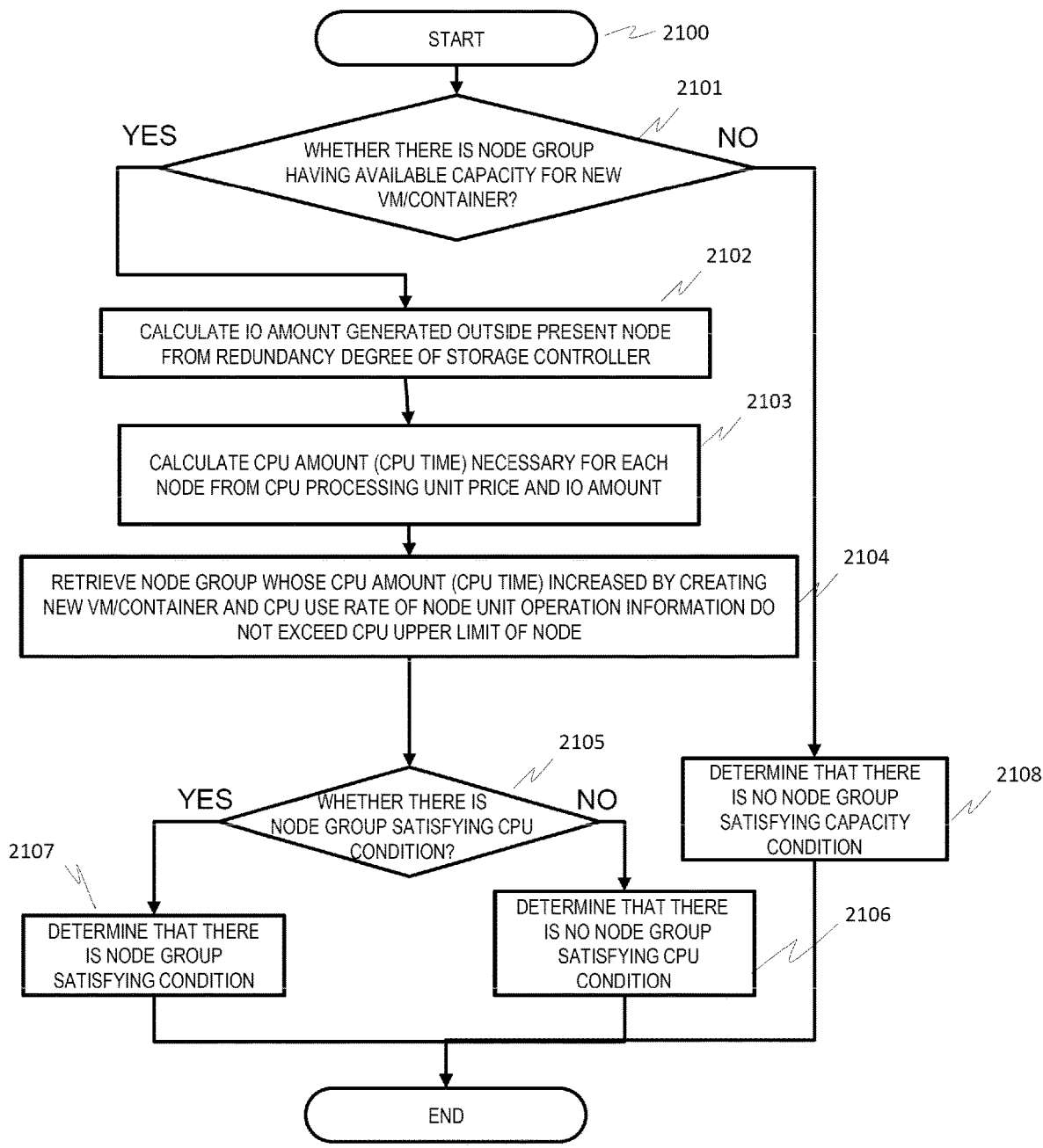
FIG. 21 is a flow diagram of calculating a node group satisfying a VM/container creation condition according to Example 3.

FIG. 21 is a processing flow diagram of determining allocation of a newly created VM/container or volume according to Example 3. This is an example in which the configuration of FIG. 19 is used in Example 1, and data redundancy is performed by a management unit. FIG. 21 corresponds to FIG. 16 of Example 1, and FIG. 22 corresponds to FIG. 17 of Example 1.

A basic flow corresponds to the processing shown in FIG. 16 of Example 1. A processing is added between step S1601 and step S1602 in FIG. 16, in which an IO amount generated outside the present node is calculated from a redundancy type of a storage controller in step S2102. Other steps correspond to the steps in FIG. 16, and description thereof will be omitted. This processing is a step for considering an IO from a storage VM of another node in addition to an IO from an application VM of the present node so as to ensure redundancy of data and to store a replica of data of different nodes.

Figure 22:
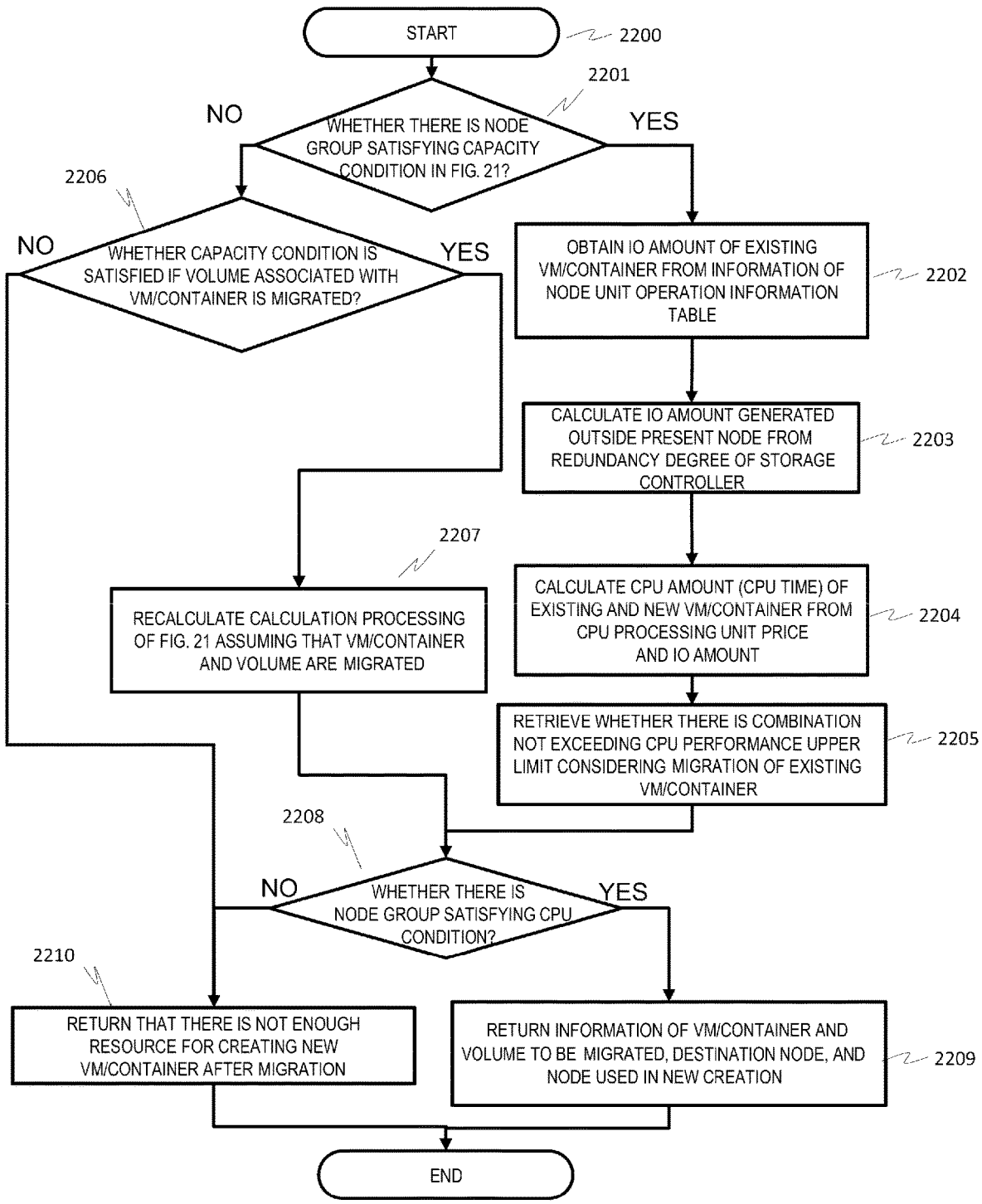
FIG. 22 is a flow diagram of calculating whether a condition is satisfied by migration of an existing VM/container according to Example 3.

FIG. 22 is a flow diagram of calculating, by the management unit, whether or not a condition is satisfied by migration of an existing VM/container according to Example 3. FIG. 22 corresponds to FIG. 17 of Example 1, and a step of calculating an IO amount generated outside the present node from a redundancy type of the storage controller in step S2203 is provided between Step 1702 and step S1703 in FIG. 17.

Information of other nodes specifies a storage controller having the same value for the same group ID from FIG. 20. For example, it is understood that with respect to the node_ID "1", a storage controller considered as the IO of other nodes is a storage controller "20" of a node 3 managed as a pair, that is, a storage controller having the same group_ID "3" as a storage controller "26" of the node "1". The storage controller "20" is an application on a VM and can be identified by an App_ID. Therefore, through managing the application performance management information of FIG. 13 for each application, the IO amount from other nodes can be grasped.

According to Example 3, in a storage system having a multi-node configuration, an IO amount generated at a node can be calculated in consideration of an IO from other nodes. That is, when the storage controller of the present node and a storage controller of another node are paired, IO processing from an application VM is performed when the storage controller of the other node is active, the storage controller of the present node is in a standby state, and redundant data are stored in the present node. In this case, it is possible to specify an IO amount from the other node and calculate computer resources such as a CPU and a capacity used in the present node.

Example 4

Figure 23:
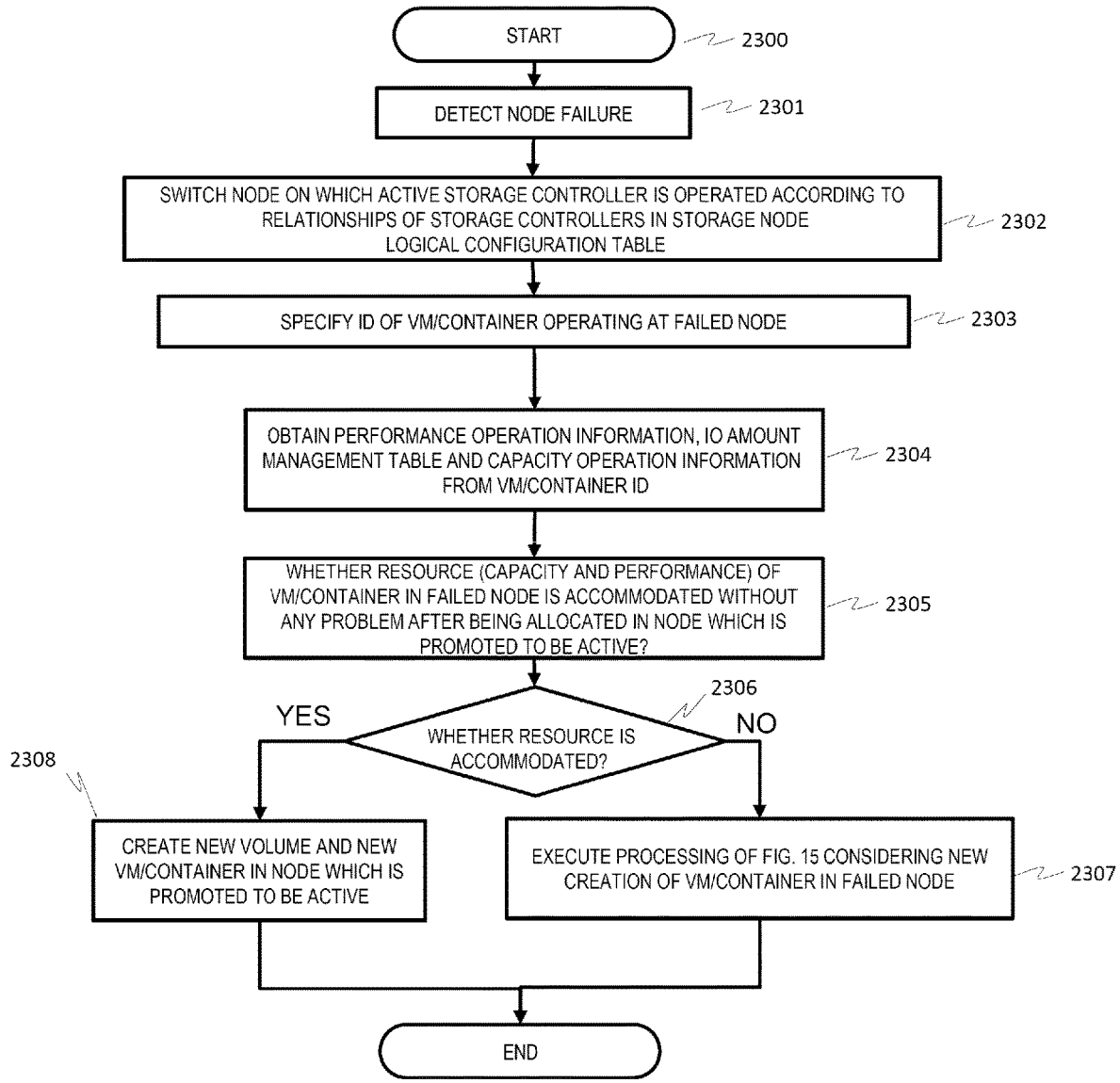
FIG. 23 is a flow diagram showing an allocation determination processing of a VM/container and a volume when a node failure occurs according to Example 4

FIG. 23 is a flow diagram showing an allocation determination processing of a VM/container and a volume when a node failure occurs according to Example 4. The processing in FIG. 23 corresponds to FIG. 18 of Example 2, and the processing in FIG. 23 is performed by a VM/container management program of a management unit, in which an active storage controller calculates where a user VM/container migrated from a failed node, due to a node failure, should be allocated when a failover occurs in another node.

First, a node failure is detected (S2301). Next, a node on which an active storage controller is operated is switched according to relationships of storage controllers in a storage node logical configuration table (S2302). Next, referring to the VM management table 509, an ID of a VM/container operating at a failed node is specified (S2303). Next, the performance operation information 506, the IO amount management table 511, and the capacity operation information 512 are obtained from the ID of the VM/container (S2304).

Next, it is determined whether a resource (capacity, performance) of the VM/container in the failed node is accommodated without any problem after being allocated in a node which is promoted to be active (S2306), and when the resource is accommodated, a new volume and a new VM/container are created in the active-promoted node (S2308). If the resource cannot be accommodated, it is considered to newly create a VM/container in the failed node, and the processing of FIG. 15 is executed.

According to the processing shown in FIG. 23, an active storage controller can calculate where a user VM/container migrated from a failed node, due to a node failure, should be allocated when a failover occurs in another node, within a range of an upper limit of the computer resource of the node.

Example 5

Figure 24:
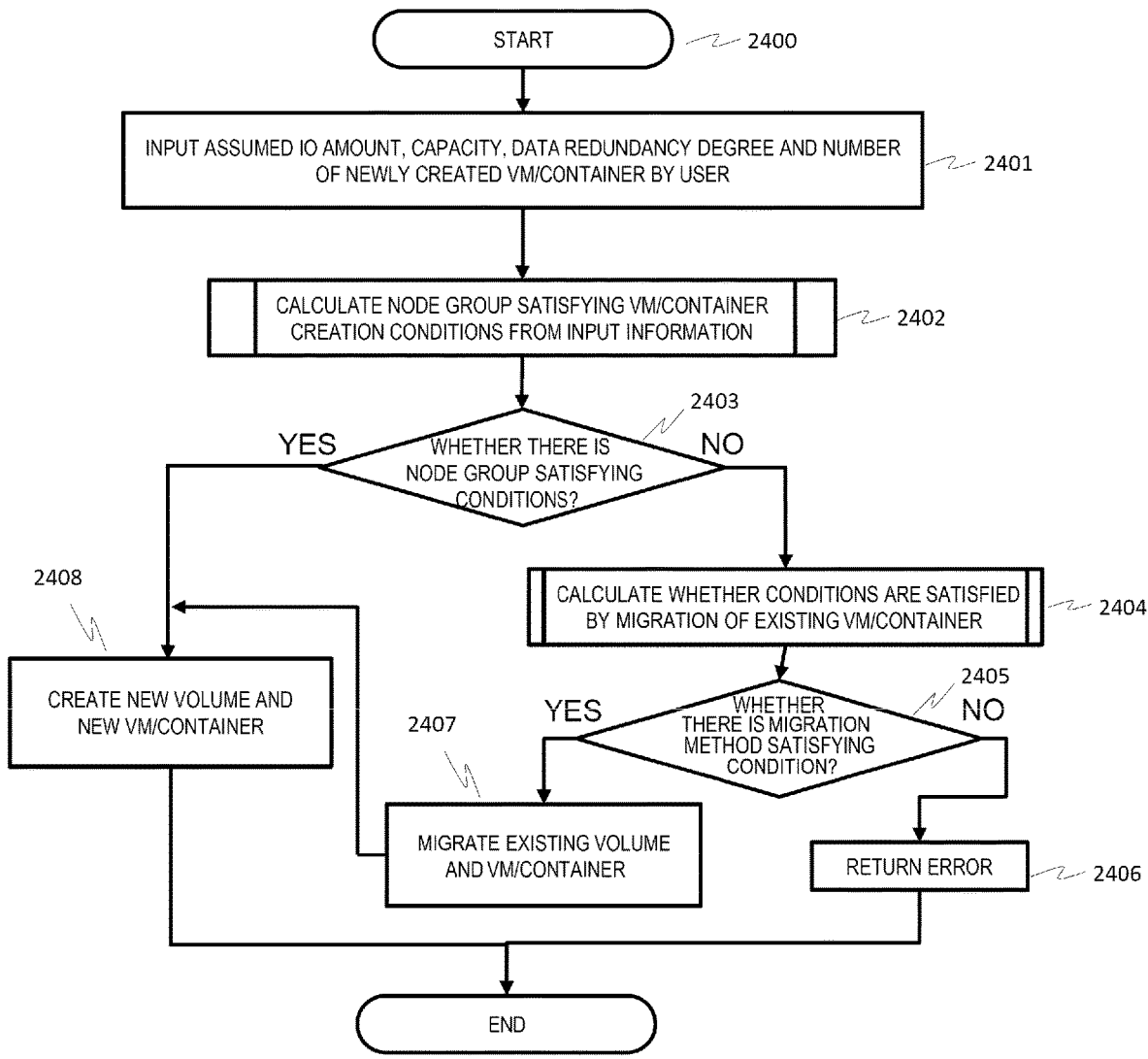
FIG. 24 is a processing flow diagram of determining allocation of a newly created VM/container and volume according to Example 5.

FIG. 24 is a processing flow diagram of a management unit of determining allocation of a newly created VM/container or volume according to Example 5. The processing of FIG. 24 corresponds to the processing of FIG. 15, except for 52407 and S2408, and is executed by the storage management program 502. As a difference from Example 3, the IO amount of the other node is specified, and the computer resources such as the CPU and the capacity used in the present node are calculated, according to a predetermined redundancy type specified by a user, information of a redundancy type and a redundancy destination node ID held in the pool configuration information in FIG. 10.

Figure 25:
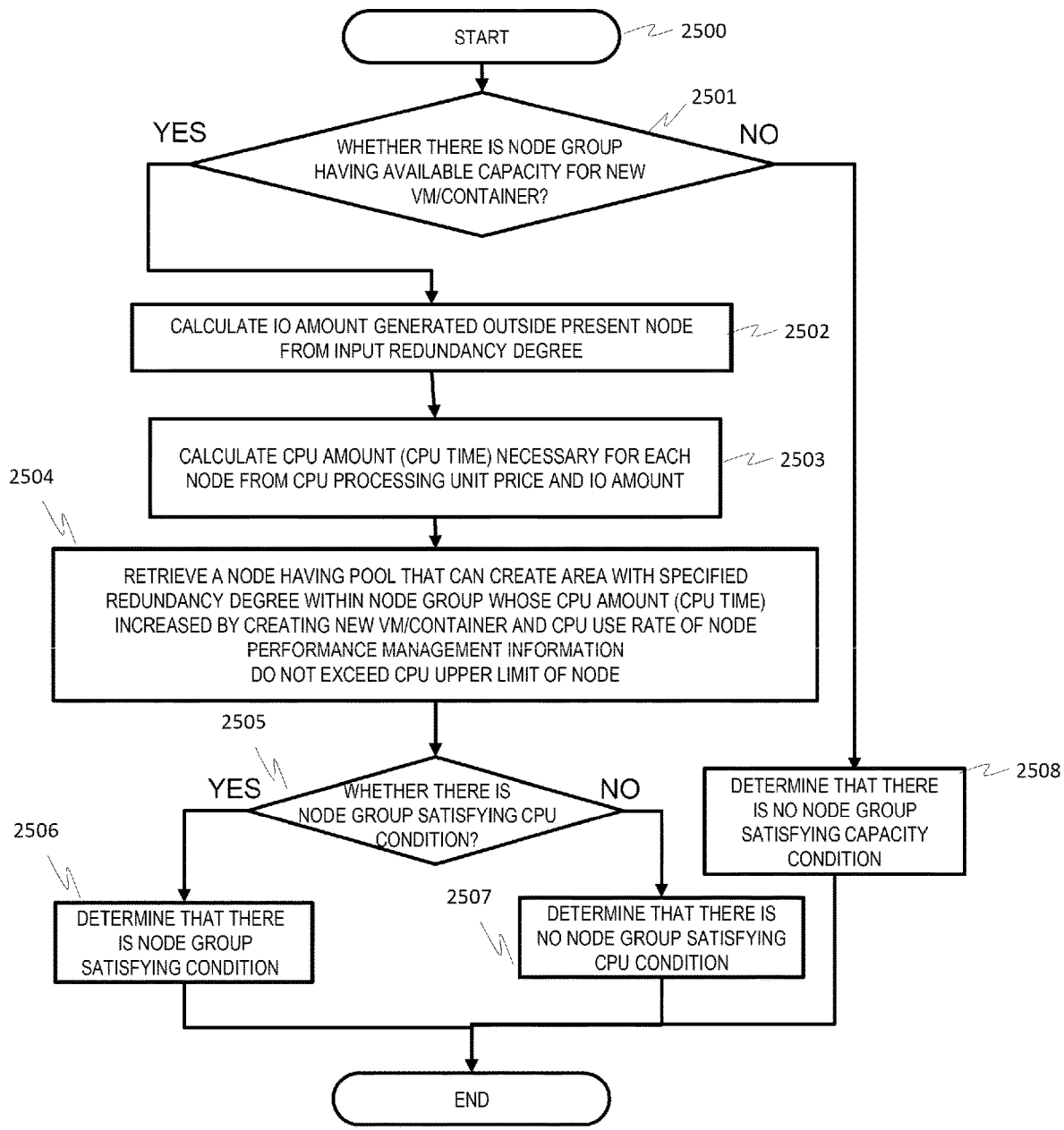
FIG. 25 is a flow diagram of calculating a node group satisfying a VM/container creation condition according to Example 5.

In a first step, a user inputs an assumed IO amount, a capacity, a data redundancy type, and the number to be created of the newly created VM/container (S2401). The redundancy type of the data is added, which is different from FIG. 15. Next, a node group satisfying the VM/container creation condition is calculated from the input information (S2402). Since the redundancy type is added in this processing, the processing of FIG. 25 is performed. The redundancy type corresponds to the redundancy type described in the configuration information of FIG. 10.

Figure 26:
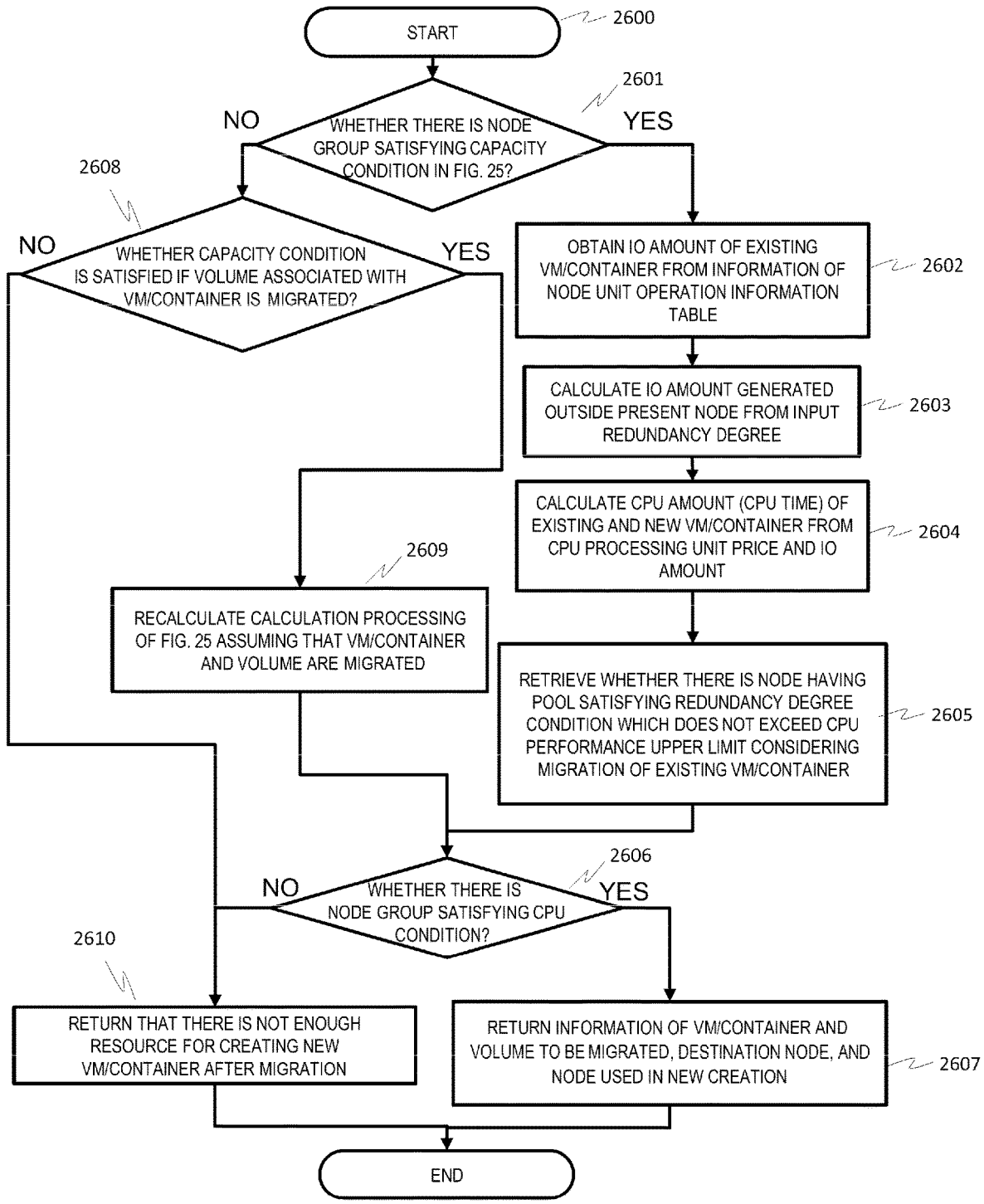
FIG. 26 is a flow diagram of calculating whether a condition is satisfied by migration of an existing VM/container according to Example 5.

If there is no node that satisfies the condition in step S2403, whether the condition is satisfied by migration of an existing VM/container is calculated (S2404), and the processing of FIG. 26 is performed since the redundancy type is added. The rest is the same as the processing of FIG. 15.

FIG. 25 is a processing flow diagram of the management unit of calculating the node group satisfying the VM/container creation condition according to Example 5. This processing corresponds to the processing of FIG. 16 of Example 1 and the processing of FIG. 21 of Example 3. A step S2502 is added, in which an IO amount generated by a node other than the present node is calculated from the input redundancy type. A step S2504 of retrieving is added, in which the retrieving is performed for a node having a pool that can create an area with the specified redundancy type, within a node group whose CPU amount (CPU time) increased by creating the new VM/container and CPU use rate of the node performance management information do not exceed a CPU upper limit of the node.

FIG. 26 is a processing flow diagram of the management unit of calculating whether or not the condition is satisfied by migration of an existing VM/container according to Example 5. FIG. 26 corresponds to the processing shown in FIG. 17 of Example 1 and FIG. 22 of Example 3. What are different are a step S2603 of calculating the IO amount generated outside the present node from the input redundancy type, and a step S2605 of retrieving whether there is a node having a pool satisfying the redundancy type condition which does not exceed a CPU performance upper limit considering the migration of the existing VM/container.

According to Example 5, a partner node of redundancy can be determined from the pool configuration information, and a destination of a VM and a volume is determined without exceeding the upper limit of the computer resource of the node in consideration of the IO amount generated by the other node.

Example 6

Figure 27:
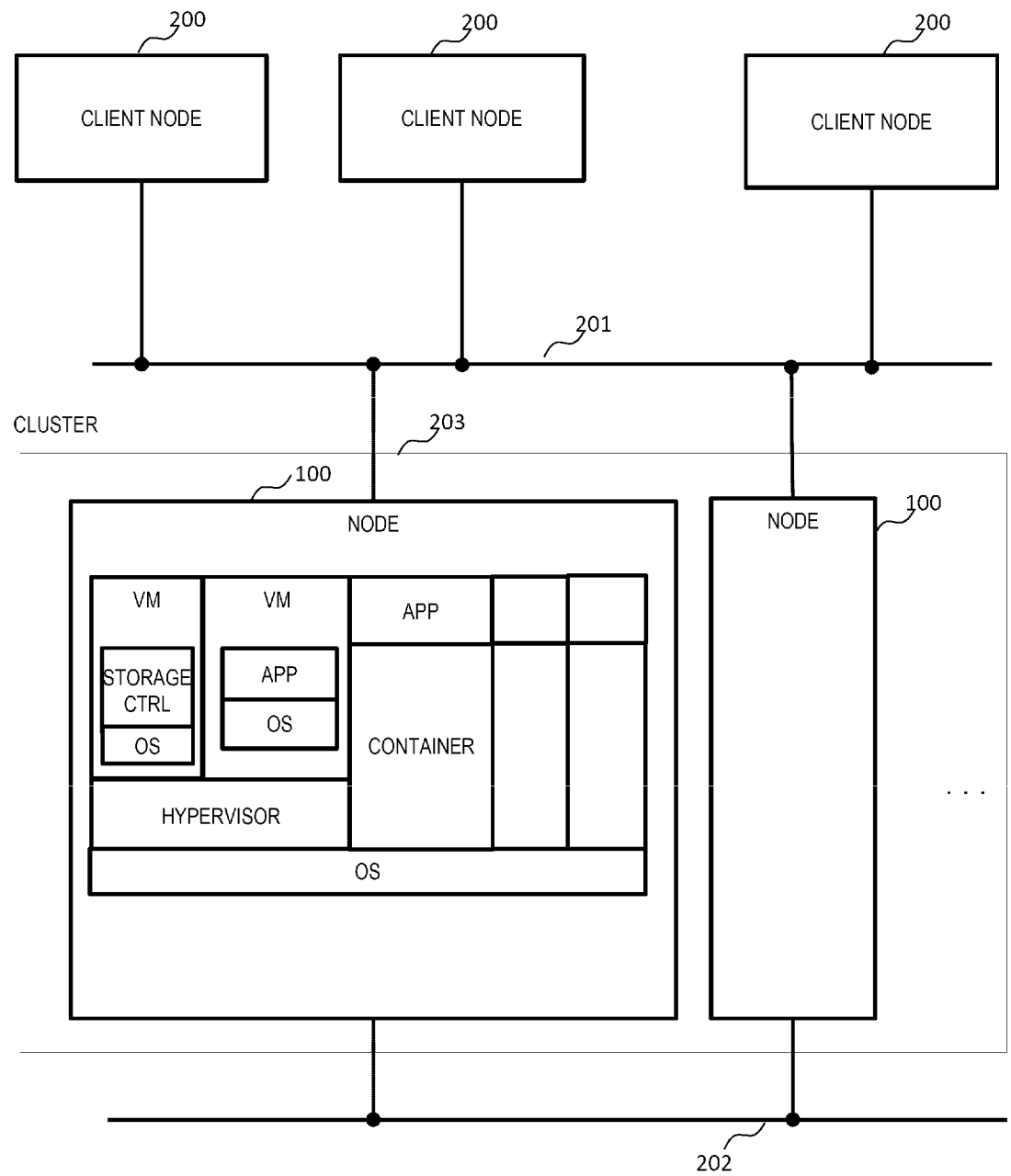
FIG. 27 is an overall configuration diagram of a system according to Example 6.

FIG. 27 is an overall configuration diagram of a system according to Example 6. A difference between FIG. 27 and FIG. 2 of Example 1 and FIG. 19 of Example 3 is that the container is created not on the VM of the hypervisor, but on an OS which does not pass through the hypervisor.

In this configuration, access to user data is through a volume provided by a storage controller. IO may pass through the container without passing through the hypervisor. Different from Example 1, a VM is not necessary when the container is specified (the container ID and VM_ID have no relationship therebetween in the VM management table, the container management table, and the storage node logical configuration table, and a VM_ID column in the container management table is changed to a node ID column).

According to the invention, only configurations are changed, and the processing flow is not changed. As a modification, a storage controller may be directly operated on an OS of a lowest layer.

What is claimed is:

1. A resource allocation determination method that determines allocation of at least one of a virtual machine, a container, and a volume in a system of a hyperconverged infrastructure environment in which a plurality of nodes are included, and in each of the plurality of nodes, at least one of the virtual machine and the container operates, and at least one of the virtual machine or the container serves as a storage controller which operates a storage OS, and controls an input/output IO for data reading from and data writing to a volume which serves as a data storage area, wherein each node of the plurality of nodes
includes a computer resource including a CPU that processes data, a memory, and a storage device that stores a program, control information and data, and manages a use state of the computer resource, the computer resource being shared by the virtual machine and the storage controller operating on each of the nodes, a management unit, wherein each node of the plurality of nodes calculates a first CPU amount used by a virtual machine or container, which operates as a newly created or moved candidate application, are calculated, wherein each node of the plurality of nodes calculates a second CPU amount used by the virtual machine or container as the storage controller, based on an TO amount and redundancy scheme of the virtual machine or the container running as the application, wherein the management unit implemented in at least one node of the plurality of nodes determines, based on the first CPU amount and the second CPU amount, a node having a calculated CPU amount equal to the sum of the first CPU amount and the second CPU amount as an allocation destination node of the virtual machine, the container, or the volume without exceeding an upper limit of a computer resource of the allocation destination node.

2. The resource allocation determination method according to claim 1, wherein
the use state of the computer resource includes at least one of:
a use state of a storage capacity configured by the storage device in each of the nodes;
a use state of a CPU in each of the nodes;
a use state of memory in each of the nodes; and
a use state of a network bandwidth.

3. The resource allocation determination method according to claim 2, wherein
when there is no node to be an allocation destination of the virtual machine or the volume based on the use state of the computer resource, any of the virtual machine, the container, the volume, or the storage controller on a first node of the plurality of nodes is migrated to a second node, so that the first node is set as the allocation destination of the virtual machine or the volume.

4. The resource allocation determination method according to claim 3, wherein
when a failure occurs in the second node of the plurality of nodes, a virtual machine or container operating on the second node is specified, and
at least one of the virtual machine, the container, and a volume operating on the second node is created at a third node based on the use state of the computer resource, the third node being a node having a calculated storage area capacity of the storage device and the CPU amount.

5. The resource allocation determination method according to claim 1, wherein
when a failure occurs in a second node of the plurality of nodes, the virtual machine or the container operating on the second node is specified, and
at least one of the virtual machine, the container, and the volume operating on the second node is created at a third node based on the use state of the computer resource, the third node being a node having a calculated storage area capacity of the storage device and the CPU amount.

6. A resource allocation determination method that determines allocation of at least one of a virtual machine, a container, and a volume in a system of a hyperconverged infrastructure environment, the system including in which a plurality of nodes are included, and in each of the plurality of nodes, at least one of the virtual machine and the container operates, and at least one of the virtual machine or the container serves as a storage controller which operates a storage OS, and controls an input/output IO for data reading from and data writing to a volume which serves as a data storage area, wherein
includes a computer resource including a CPU that processes data, a memory, and a storage device that stores a program, control information and data,
a fourth node of the plurality of nodes includes a first storage controller, a first volume, and a first drive, in which the first storage controller processes an TO request for the volume from the virtual machine and writes data to the first drive,
a fifth node of the plurality of nodes includes a second storage controller, a second volume, and a second drive, in which the second storage controller operates as a redundancy destination storage controller of the first storage controller, receives redundant data from the first storage controller, and writes redundant data to the second drive,
each of the plurality of nodes manages a computer resource configured to write the redundant data in addition to a use state of the computer resource shared by the virtual machine and the storage controller operating on each of the nodes,
a management unit,
wherein each of the plurality of nodes calculates a first CPU amount used by a virtual machine or container, which operates as a newly created or moved candidate application, are calculated,
wherein each of the plurality of nodes calculates a second CPU amount used by the virtual machine or container as the storage controller, based on an TO amount and redundancy scheme of the virtual machine or the container running as the application,
wherein the management unit implemented in at least one node of the plurality of nodes determines, based on the first CPU amount and a second CPU amount, a node having a calculated CPU amount equal to the sum of the first CPU amount and the second CPU amount an allocation destination node of a virtual machine, container, or volume without exceeding an upper limit of a computer resource of the allocation destination node.

7. The resource allocation determination method according to claim 6, wherein
when there is no node to be an allocation destination of a virtual machine or volume, any of the virtual machine, the container, the volume, or the storage controller on a specified node of the plurality of nodes is migrated to another node based on the use state of the computer resource, so that the specified node is set as the allocation destination of the virtual machine or volume.

8. The resource allocation determination method according to claim 7, wherein
when a failure occurs in a sixth node of the plurality of nodes, the virtual machine or the container operating on the sixth node is specified, and
at least one of the virtual machine, the container, and a volume operating on the sixth node is created at a seventh node based on the use state of the computer resource, the seventh node having a calculated storage area capacity and the CPU amount.

9. A resource allocation determination method that determines allocation of at least one of a virtual machine (VM), a container, and a volume in a system of a hyperconverged infrastructure environment in which a plurality of nodes are included, and in each of the plurality of nodes, at least one of the virtual machine and the container operates, and at least one of the virtual machine or the container serves as a storage controller which operates a storage OS, and controls an input/output IO for data reading from and data writing to a volume which serves as a data storage area, wherein
each node of the plurality of nodes
includes a computer resource including a CPU that processes data, a memory, and a storage device that stores a program, control information and data,
manages a redundancy configuration to perform redundancy of data in the plurality of nodes,
causes the storage controller to perform data reading and writing control on a drive of a present node via the volume serving as the data storage area, and redundancy processing on a drive of another node based on the redundancy configuration, and manages a use state of the computer resource in consideration of the redundancy configuration, the computer resource being shared by the virtual machine and the storage controller operating on each of the nodes, a management unit, wherein each of the plurality of nodes calculates a first CPU amount used by a virtual machine or container, which operates as a newly created or moved candidate application, are calculated, wherein each of the plurality of nodes calculates a second CPU amount used by the virtual machine or container as the storage controller, based on an TO amount and redundancy scheme of the virtual machine or the container running as the application, wherein the management unit implemented in at least one node of the plurality of nodes determines, based on the first CPU amount and a second CPU amount, a node having a calculated CPU amount equal to the sum of the first CPU amount and the second CPU amount an allocation destination node of the virtual machine, a container, or a volume without exceeding an upper limit of a computer resource of the allocation destination node.

10. The resource allocation determination method according to claim 9, wherein when there is no node to be an allocation destination of the virtual machine or the volume based on the use state of the computer resource, any of the virtual machine, the container, or the storage controller on one node of the plurality of nodes is migrated to another node, so that a specified node in the plurality of nodes is set as the allocation destination of the virtual machine or the volume.

11. The resource allocation determination method according to claim 9, wherein when a failure occurs in an eighth node of the plurality of nodes, the virtual machine or the container operating on the eighth node is specified, and the virtual machine or the container operating on the eighth node is created at a ninth node based on the use state of the computer resource, the ninth node having a calculated storage area capacity and the CPU amount.

12. A storage system of a hyperconverged infrastructure environment in which a plurality of nodes are included, and in each of the plurality of nodes, at least one of a virtual machine and a container operates, and at least one of the virtual machine or the container serves as a storage controller which operates a storage OS, and controls an input/output IO for data reading from and data writing to a volume which serves as a data storage area, wherein each node of the plurality of nodes includes a computer resource including a CPU that processes data, a memory, and a storage device that stores a program, control information and data, causes the storage controller to perform data reading and writing control on a drive of a present node via the volume serving as the data storage area, and a redundancy processing on a drive of another node, manages a use state of the computer resource, the computer resource being shared by the virtual machine and the storage controller operating on each of the nodes, a management unit, wherein each of the plurality of nodes calculates a first CPU amount used by a virtual machine or container, which operates as a newly created or moved candidate application, are calculated, wherein each of the plurality of nodes calculates a second CPU amount used by the virtual machine or container as the storage controller, based on an TO amount and redundancy scheme of the virtual machine or the container running as the application, wherein the management unit implemented in at least one node of the plurality of nodes configured to determine, based on the first CPU amount and a second CPU amount, a node having a calculated CPU amount equal to the sum of the first CPU amount and the second CPU amount an allocation destination node of a new virtual machine, container, or volume without exceeding an upper limit of a computer resource of the allocation destination node.

* * * * *